US006470092B1

(12) United States Patent
Li et al.

(10) Patent No.: US 6,470,092 B1
(45) Date of Patent: Oct. 22, 2002

(54) PROCESS, SYSTEM AND COMPUTER READABLE MEDIUM FOR PULMONARY NODULE DETECTION USING MULTIPLE-TEMPLATES MATCHING

(75) Inventors: Qiang Li, Clarendon Hills, IL (US); Shigehiko Katsuragawa, Oita (JP); Kunio Doi, Willowbrook, IL (US)

(73) Assignee: Arch Development Corporation, Chicago, IL (US)

( * ) Notice: Subject to any disclaimer, the term of this patent is extended or adjusted under 35 U.S.C. 154(b) by 113 days.

(21) Appl. No.: 09/716,335

(22) Filed: Nov. 21, 2000

(51) Int. Cl.$^7$ .................................................. G06K 9/00
(52) U.S. Cl. ...................................... 382/132; 382/218
(58) Field of Search ................................. 382/128, 130, 382/131, 132, 209, 216, 217, 218, 219, 278; 128/922

(56) References Cited

U.S. PATENT DOCUMENTS

| | | | | |
|---|---|---|---|---|
| 4,802,231 A | * | 1/1989 | Davis | 382/34 |
| 5,233,519 A | * | 8/1993 | Ito | 364/413.22 |
| 6,026,174 A | * | 2/2000 | Palcic et al. | 382/133 |
| 6,320,976 B1 | * | 11/2001 | Murthy et al. | 382/128 |

* cited by examiner

Primary Examiner—Andrew W. Johns
(74) Attorney, Agent, or Firm—Oblon, Spivak, McClelland, Maier & Neustadt, P.C.

(57) ABSTRACT

A method to determine whether a candidate abnormality in a medical digital image is an actual abnormality, a system which implements the method, and a computer readable medium which stores program steps to implement the method, wherein the method includes obtaining a medical digital image including a candidate abnormality; obtaining plural first templates and plural second templates respectively corresponding to predetermined abnormalities and predetermined non-abnormalities; comparing the candidate abnormality with the obtained first and second templates to derive cross-correlation values between the candidate abnormality and each of the obtained first and second templates; determining the largest cross-correlation value derived in the comparing step and whether the largest cross-correlation value is produced by comparing the candidate abnormality with the first templates or with the second templates; and determining the candidate abnormality to be an actual abnormality when the largest cross-correlation value is produced by comparing the candidate abnormality with the first templates and determining the candidate abnormality to be a non-abnormality when the largest cross-correlation value is produced by comparing the candidate abnormality with the second templates. An actual abnormality is similarly classified as malignant or benign based on further cross-correlation values obtained by comparisons with additional templates corresponding to malignant and benign abnormalities.

46 Claims, 22 Drawing Sheets

PROCESS, SYSTEM AND COMPUTER READABLE MEDIUM FOR PULMONARY NODULE DETECTION USING MULTIPLE-TEMPLATES MATCHING

STATEMENT REGARDING FEDERALLY SPONSORED RESEARCH

The present invention was made in part with U.S. Government support under USPHS grant numbers CA62625 and CA64370 (National Institute of Health). The U.S. Government has certain rights in the invention.

BACKGROUND OF THE INVENTION

1. Field of the Invention

This invention relates to a process, system and computer readable medium for the automated detection of pulmonary nodules in medical images.

The present invention also generally relates to computerized techniques for automated analysis of digital images, for example, as disclosed in one or more of U.S. Pat Nos. 4,839,807; 4,841,555; 4,851,984; 4,875,165; 4,907,156; 4,918,534; 5,072,384; 5,133,020; 5,150,292; 5,224,177; 5,289,374; 5,319,549; 5,343,390; 5,359,513; 5,452,367; 5,463,548; 5,491,627; 5,537,485; 5,598,481; 5,622,171; 5,638,458; 5,657,362; 5,666,434; 5,673,332; 5,668,888; 5,740,268; 5,790,690; 5,832,103; 5,873,824; 5,881,124; 5,931,780; 5,974,165 (PCT Publication WO 95/15537); 5,982,915; 5,984,870; 5,987,345; 6,011,862; 6,058,322; 6,067,373; 6,075,878; 6,078,680; 6,088,473; 6,112,112; 6,138,045; and 6,141,437, as well as U.S. patent applications Ser Nos. 08/173,935; 08/900,188; 08/900,189; 08/979,639; 08/982,282; 09/027,468; 09/028,518; 09/092,004; 09/121,719; 09/141,535; 09/298,852 and 09/471,088; and U.S. provisional patent applications Nos. 60/107,095; 60/160,790; 60/176,297; 60/176,304; 60/180,162; 60/193,072 and 60/207,401, all of which are incorporated herein by reference.

The present invention includes use of various technologies referenced and described in the above-noted U.S. patents and patent applications, as well as described in the references identified in the appended APPENDIX by the author(s) and year of publication and cross-referenced throughout the specification by bold numerals in brackets corresponding to the respective references listed in the APPENDIX, the entire contents of which, including the related patents and applications listed above and references listed in the APPENDIX, are incorporated herein by reference.

2. Discussion of the Background

It has been reported that radiologists can fail to detect pulmonary nodules on chest radiographs in as many as 30% of positive cases. [1, 2] Many of the lung cancers missed by radiologists were actually visible in retrospect on previous radiographs. [3] Therefore, the inventors and others at the University of Chicago Department of Radiology have developed a computer-aided diagnostic (CAD) scheme to assist radiologists in the detection of pulmonary nodules on digital chest radiographs. [4–9] One problem with the pre-existing scheme is the relatively large number of false positives produced by the automated scheme, which constitutes a main difficulty in the clinical application of the CAD scheme for nodule detection.

SUMMARY OF THE INVENTION

Accordingly, the object of this invention is to provide CAD process, system and computer program product whereby the number of false positives that are incorrectly reported as nodules is reduced.

This and other objects are achieved according to the present invention by providing a new and improved method to determine whether a candidate abnormality in a medical digital image is an actual abnormality, a system which implements the method, and a computer readable medium which stores program steps to implement the method, wherein the method includes obtaining plural first templates and plural second templates respectively corresponding to predetermined abnormalities and predetermined non-abnormalities; comparing the candidate abnormality with the obtained first and second templates to derive cross-correlation values between the candidate abnormality and each of the obtained first and second templates; determining the largest cross-correlation value derived in the comparing step and whether the largest cross-correlation value is produced by comparing the candidate abnormality with the first templates or with the second templates; and determining the candidate abnormality to be an actual abnormality when the largest cross-correlation value is produced by comparing the candidate abnormality with the first templates and determining the candidate abnormality to be a non-abnormality when the largest cross-correlation value is produced by comparing the candidate abnormality with the second templates. An actual abnormality is similarly determined to be malignant or benign based on further cross-correlation values obtained by comparisons with additional templates corresponding to malignant and benign abnormalities.

The maximum cross-correlation values obtained with nodule templates and with non-nodule templates for each of the candidates nodules are employed for distinguishing non-nodules from nodules because a nodule is generally more similar to nodule templates than to non-nodule templates, and a non-nodule is more similar to non-nodule templates than to nodule templates. Therefore, the maximum cross-correlation value of a nodule with nodule templates is generally greater than that with non-nodule templates, and vice versa. Accordingly, according to the present invention, the greatest cross-correlation value obtained is determined and the candidate nodule is then determined to be an actual nodule when the greatest cross-correlation value is obtained based on a comparison with a nodule template and to be a false positive when the greatest correlation value is obtained based on a comparison with a non-nodule template.

A study implementing the CAD process of the invention was performed, whereby a large number of false positives (44.3%) in chest radiographs were removed with reduction of a very small number of true positives (2.3%) by use of the multiple-templates matching technique. In addition, a similar result on another CAD scheme for detection of nodules on CT images by use of the multiple-templates matching technique was obtained. Thus, the present invention is considered to have applicability to improve the performance of many different CAD schemes for detection of various lesions in medical images, including nodules in chest radiographs, masses and microcalcifications in mammograms, nodules, colon polyps, liver tumors, and aneurysms in CT images as well as breast lesions in ultrasound and magnetic resonance images. Furthermore, the multiple-templates matching technique has application to distinguish benign lesions from malignant lesions, in order to improve the performance of CAD schemes for classification between benign lesions and malignant lesions such as lung cancer, breast cancer, colon cancer and stomach cancer.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings wherein.

DESCRIPTION OF THE PREFERRED EMBODIMENTS

Methods and Materials

Figure 1:
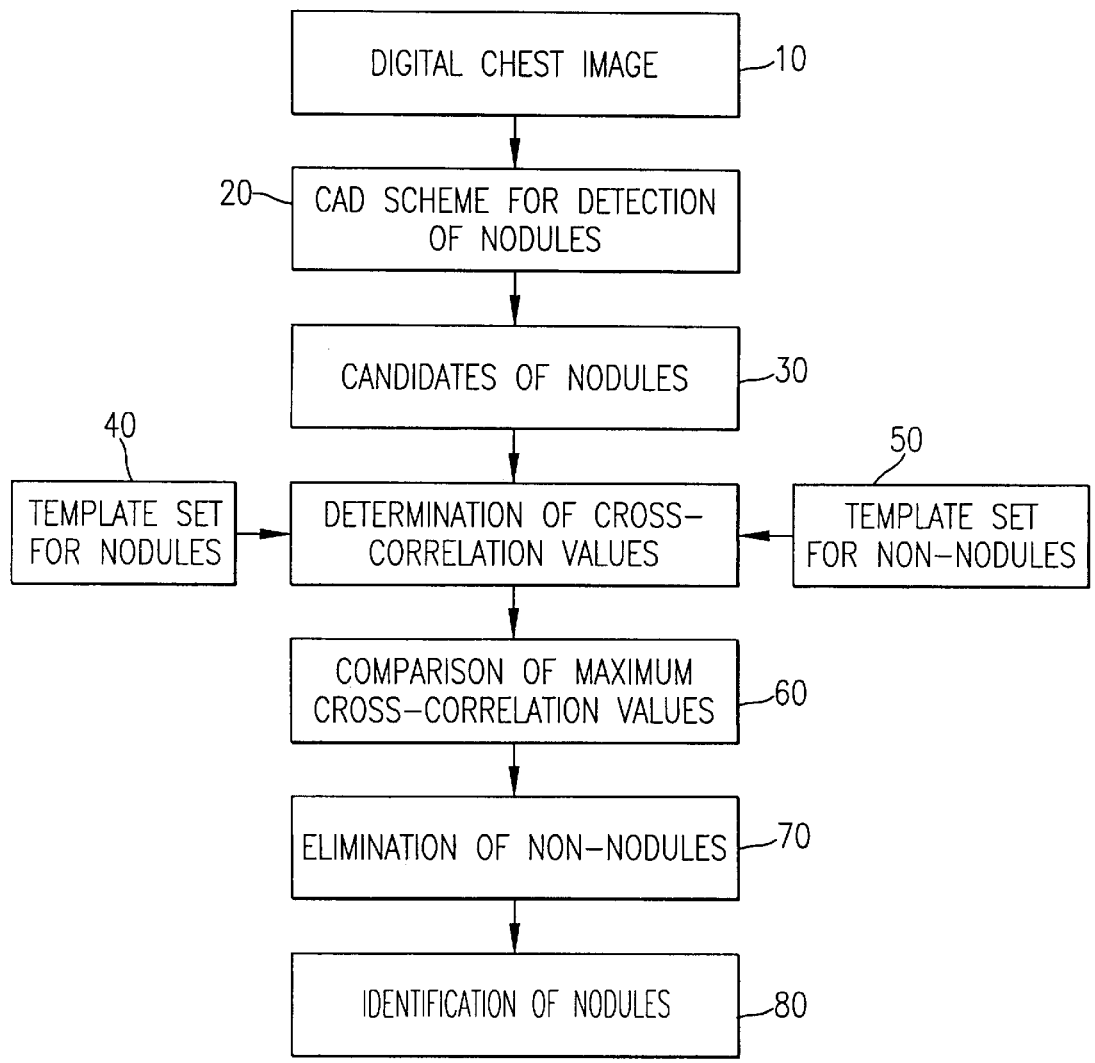
FIG. 1 is a flow chart illustrating an overall multiple-templates matching process according to the present invention.

The chest images used in first development of the present invention, as directed to chest radiographs, consisted of 100 abnormal posteroanterior (PA) chest radiographs selected in the Department of Radiology, the University of Chicago Hospitals [9]. A total of 122 nodules were confirmed, based on the consensus of two radiologists and verified by CT scans or radiographic follow-up. The nodule diameter ranged from 4 mm to 27 mm (average, 13 mm). The digital images were obtained by digitizing of the chest radiographs with a Konica laser film scanner. The original digital image has a pixel size of 0.175 mm, a matrix size of 2000×2000, and a gray level range of 10 bits. Because nodules are relatively large in chest images, the matrix size of the digital images was reduced by a factor of 4. Consequently, the final image had a pixel size of 0.7 mm and a matrix size of 500×500. In addition to the main database above, a supplemental database, the Japanese Standard Digital Image Database [10], was employed solely for creation of nodule templates and for training of the multiple-templates matching technique, but not for the verification of the present CAD scheme with the multiple-templates matching technique. The supplemental database was developed by the Japanese Society of Radiological Technology, and is described hereinafter.

With the pre-existing CAD scheme, 116 nodules and 4875 false positives were initially detected from the 100 chest images in our database. A rule-based classification technique was then applied to reduce the number of false positives, [9] with which 88 nodules and 377 false positives were obtained. For the multiple-templates matching technique, the 116 nodules and 4875 false positives detected initially by the pre-existing CAD scheme were used as initial nodule templates and initial non-nodule templates, respectively. However, the 88 nodules and 377 false positives reported finally by the present CAD scheme were used for training and testing of the final result. Eight non-nodule-like nodule templates and 1798 nodule-like non-nodule templates were systematically eliminated from the nodule template set and the non-nodule template set, respectively, so as to achieve a good performance for the multiple-templates matching technique. It is also noted that the 377 false positives in the test candidate set survived the pre-existing rule-based tests and are, therefore, considered as "difficult" false positives, which are similar to nodules. In the study, the multiple-templates matching technique was employed to reduce significantly the number of these difficult false positives.

Summary of the Pre-existing CAD Scheme Based on Rule-based Tests

First of all, the lung areas in PA chest images were segmented by use of the delineated ribcage edges, lung top, and diaphragm, [11, 12] and were employed for the subsequent processing of the CAD scheme. A difference image was then obtained by subtraction of a nodule-suppressed image (by use of a smooth filter) from a nodule-enhanced image (by use of a matched filter), so that the complicated background structure could be reduced, and thus nodules could be more conspicuous. In order to detect the initial nodule candidates from the difference image, multiple binary images were obtained by thresholding the difference image with various threshold levels. In each of the binary images, a component labeling technique was used to identify each isolated "island," [4] and two features, the effective diameter and the degree of circularity, were determined for each island. An island was then considered to be an initial nodule candidate if its effective diameter and degree of circularity were equal to or larger than 6.5 mm and 0.65, respectively. For the database of 100 abnormal chest images, a total of 116 (out of 122) nodules and 4875 false positives were identified as initial nodule candidates.

Next, a region growing technique [5, 6] was applied to both the difference image and the original image at the locations of initial nodule candidates, for accurate segmentation of nodule candidates from background in each of the two images. Various features, such as the effective diameter, contrast, degree of circularity, degree of irregularity, edge gradient, slope of circularity, slope of irregularity, and slope of diameter, were then determined from each of the grown regions, and employed for distinction between nodules and false positives by a rule-based classification techniques. After this step, most nodules, 88 (75.9%) out of 116, were retained, and most false positives, 4498 (92.3%) out of 4875, were eliminated; thus, 377 false positives remained.

Overall Scheme of the Multiple-templates Matching Technique for Reduction of False Positives FIG. 1 shows the overall scheme for the multiple-templates matching process of the present invention. First of all, in step 10 a digital chest image is obtained and in step 20 a CAD scheme for nodule detection is applied and in step 30 candidate nodules are obtained thereby. In steps 40 and 50, nodule templet sets and non-nodule templet steps are obtained, and in step 60, for each of the candidate nodules, a cross-correlation technique is employed to calculate the cross-correlation values with the nodule template set and with the non-nodule template set. Finally, two maximum cross-correlation values obtained with the nodule template set and with the non-nodule template set are determined, and employed to eliminate false positives (non-nodules) in step 70. Resulting in the identification of the remaining candidate nodules as actual nodules in step 80. If the maximum cross-correlation value is obtained by comparison of the candidate nodule with a non-nodule template, then the candidate nodule is determined to be a false positive. On the other hand, if the maximum cross-correlation value is obtained by comparison of the candidate nodule with a nodule template, then the candidate nodule is determined to be an actual nodule.

In order to apply the multiple-templates matching technique, two multiple-template sets, i.e., one with a large number of nodule templates and another with a large number of non-nodule templates, were created. In this study, the initial nodule candidates (116 nodules and 4875 non-nodules) reported by the pre-existing CAD scheme were used as initial templates, which were small regions of interest (ROIs) of 36×36 pixels centered at the locations of the initial nodule candidates.

Figure 2:
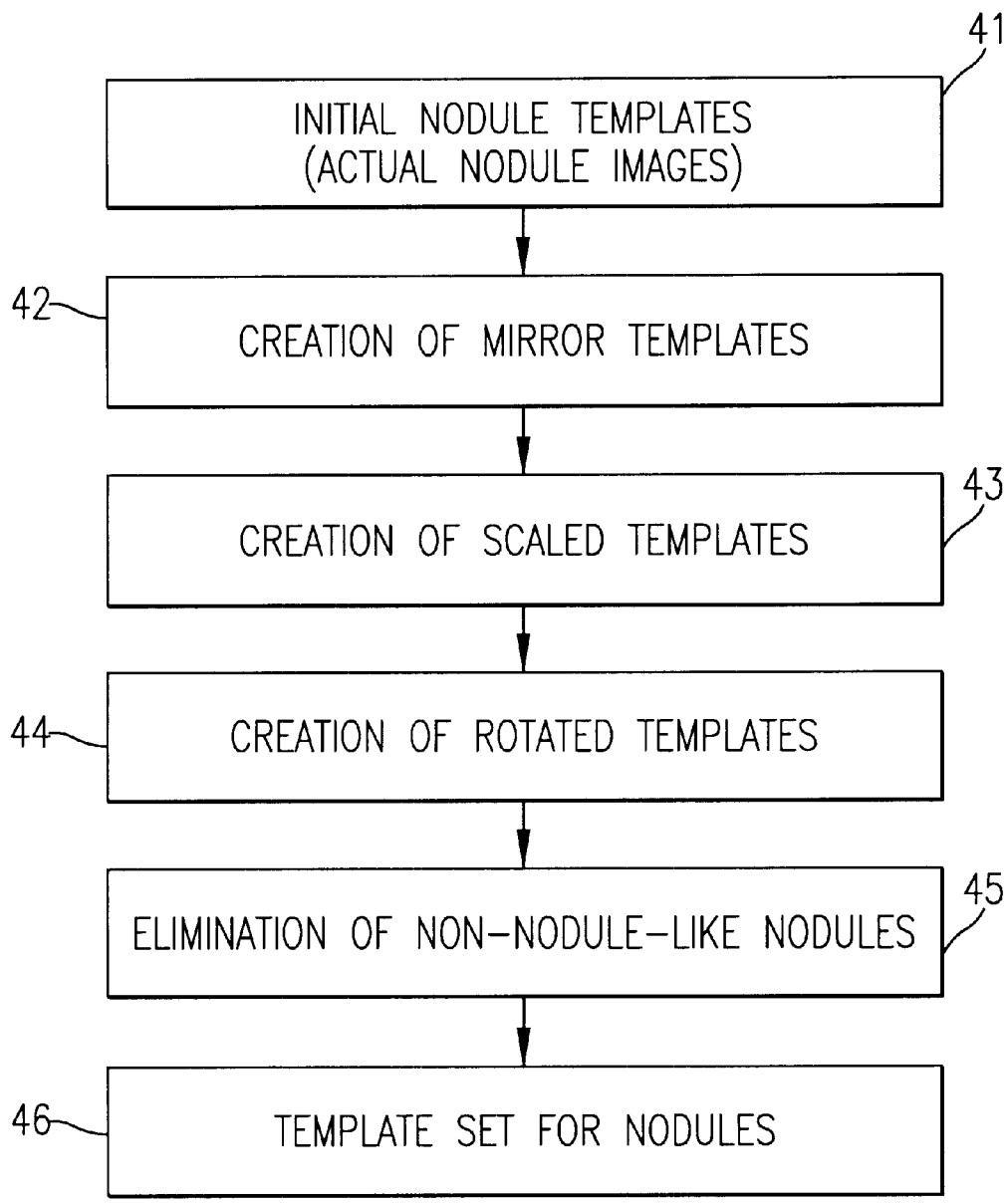
FIG. 2 is a flow chart illustrating a basic process for the creation of a nodule template set.

FIG. 2 shows the basic scheme for creation of the nodule template set from the initial nodule templates. In step 41 the initial nodule templates were obtained and then in step 42, each of the nodule templates was first right/left reversed to produce a mirror template so that the number of templates would be doubled. Then in step 43, each of the nodule templates was scaled (minified or magnified), and in step 44 also rotated to increase the number of nodule templates further. Finally, in step 45 eight non-nodule-like nodule templates (atypical nodules such as very subtle nodules overlapping ribs) were carefully identified as inappropriate nodule templates, and thus excluded from the nodule template set, to derive in step 46 the template set for nodules.

Figure 3:
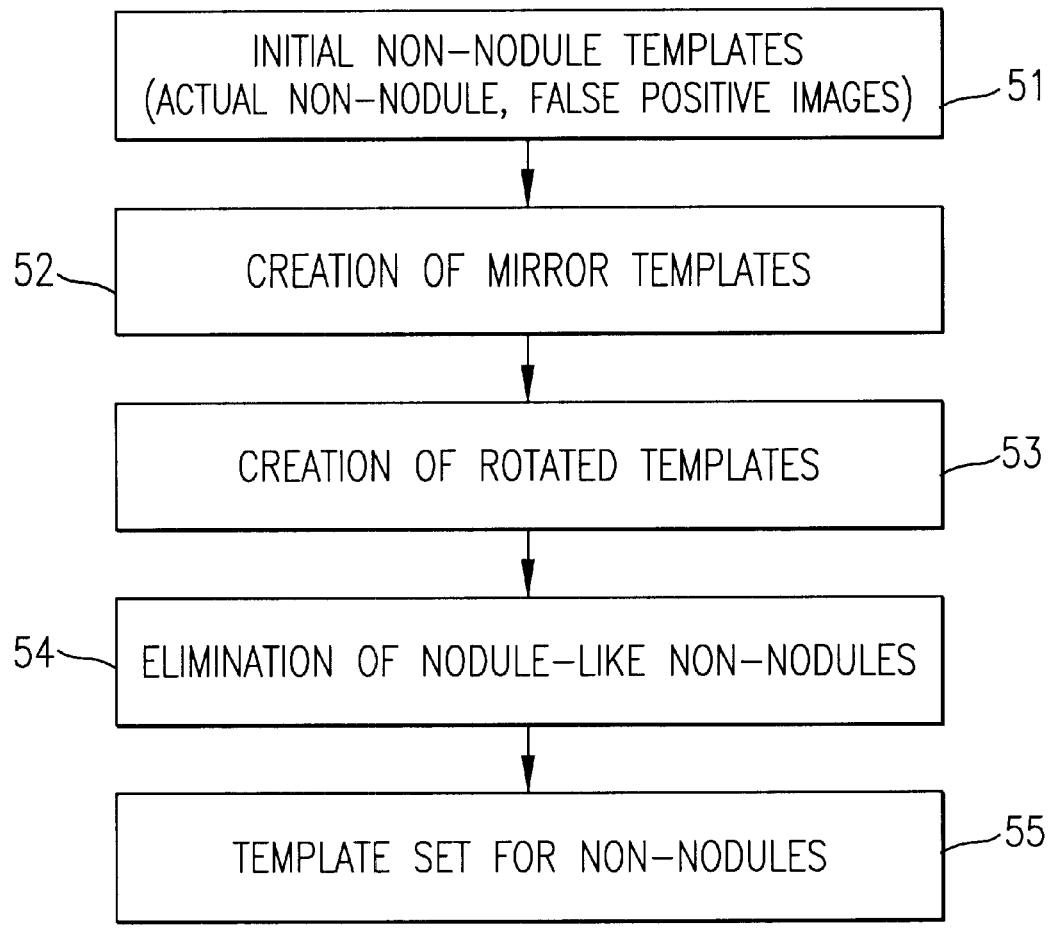
FIG. 3 is a flow chart illustrating a basic process for the creation of a non-nodule template set.

FIG. 3 shows a similar scheme for creation of the non-nodule template set. Each of the non-nodule templates obtained in step 51 was first right/left reversed in step 52, and also rotated in step 53 to increase the number of non-nodule templates. Many (1789) non-nodule templates that had a similar appearance as nodules were then systematically removed in step 54 from the non-nodule template set by use of a training set, as will be hereinafter, because the presence of these nodule-like non-nodule templates can considerably degrade the performance of the multiple-templates matching technique. The non-nodule templates were not scaled because a relatively large number of non-nodule templates had been obtained, and also because the templates obtained by use of scaling were slightly obscured. After the removal of non-nodule-like nodule templates and nodule-like non-nodule templates, 3077 non-nodule templates in the non-nodule template set were obtained in step 55, in addition to the 108 nodule templates obtained in the nodule template set.

Figure 4:
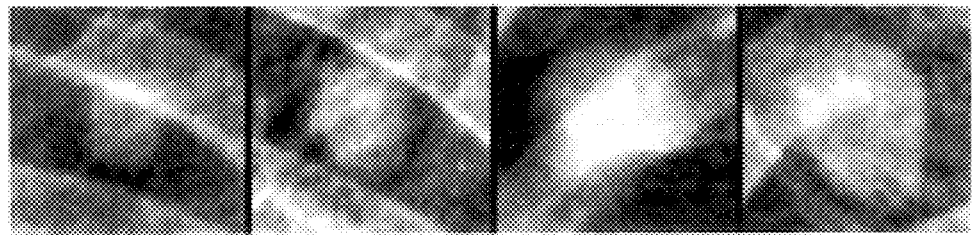
FIG. 4 is an illustration of a plurality of examples of nodule templates which are corrected for background trend.
Figure 5:
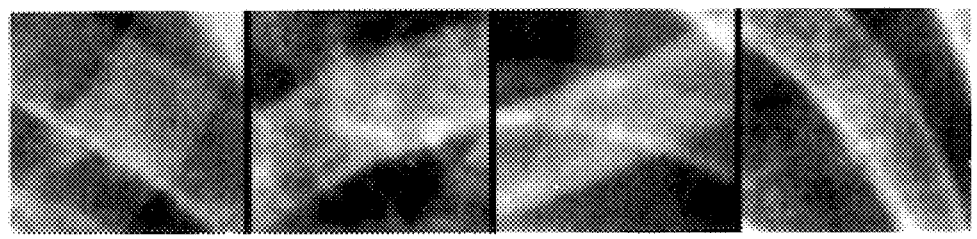
FIG. 5 is an illustration of a plurality of examples of non-nodule templates which are corrected for background trend.

FIGS. 4 and 5 show typical examples of nodule templates and non-nodule templates, respectively. It is apparent in FIGS. 4 and 5 that nodule templates and non-nodule templates are quite different in appearance, and are thus the basis for distinction between nodules and non-nodules.

The 88 nodules reported finally by the pre-existing CAD scheme were then divided into two sets, each of which had 44 randomly selected nodules. One set was employed, which is called a training set, to systematically eliminate nodule-like non-nodule templates from the non-nodule template set, as described hereinafter. The 44 nodules in the other set plus the 377 non-nodules (false positives), called a test set, were used for verifying the performance of the multiple-templates matching technique of the present invention. Similar to the templates, a test candidate was a small ROI of 40×40 pixels centered at the location of nodule candidates in the test set.

In addition to the data sets above, a small template set and a small test set were also used, in order to reduce the computation time for determination of the matrix size of templates, and for investigation of the effect of a number of parameters such as scaling and rotation of templates. The small template set included all of the 108 nodule templates in the nodule template set and 178 "typical" non-nodule templates selected manually from 4875 non-nodules. The small test set included 30 nodules and 30 non-nodules, which were randomly selected from the 88 nodules and 377 non-nodules, respectively.

Determination of Maximum Cross-correlation Values Between a Test Candidate and the Template Sets of Nodules and Non-nodules A round robin method, i.e., a leave-one-out test method, was used for the determination of cross-correlation values between templates and a test candidate; namely, if a test candidate was included in the set of templates, the corresponding template would not be used for the determination of the cross-correlation value with the test candidate. Before the actual calculation of the cross-correlation value between a template and a test candidate, a preprocessing step was utilized for correction of the background trend included in a template and test candidate. The background trend in the template (or test candidate) was represented by a two-dimensional (surface) linear function, and the coefficients of the linear function were determined by a least square method. The estimated surface function was then subtracted from the original image of the template (or the test candidate) to provide a background-trend corrected image.

Figure 6:
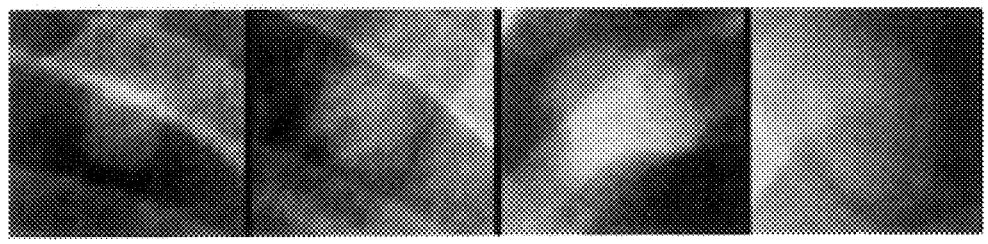
FIG. 6 is an illustration of a plurality of examples of original images for nodule templates.
Figure 7:
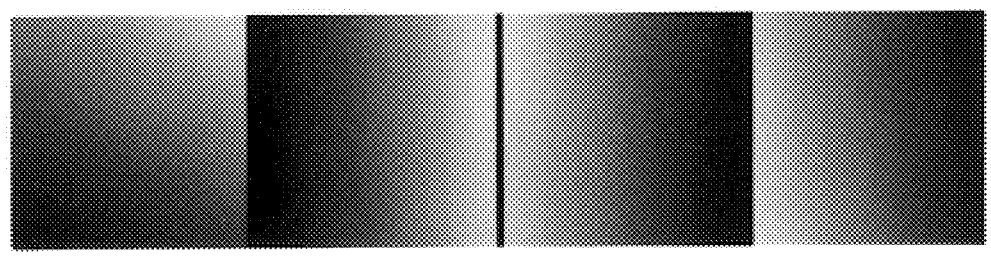
FIG. 7 is an illustration of a plurality of examples of estimated background images obtained by fitting a linear function to the original images in FIG. 6.

FIGS. 6 and 7 show the original images for templates and the estimated background, respectively. The background-trend corrected images, which were obtained by subtraction of the estimated background from the original images, are shown in FIG. 4.

The matrix size (40×40 pixels) of the test candidates is 4 pixels larger than that (36×36 pixels) of the templates in both horizontal and vertical directions. In order to determine the cross-correlation value between a template A and a test candidate B, template A was moved for a maximum shift value of 4 pixels in both horizontal and vertical directions, and a cross-correlation value $C_{ij}$ was calculated at each shift value (i,j) by the equation:

$$C_{i,j}^2 = \frac{1}{MN}\sum_{m=1}^{M}\sum_{n=1}^{N}\frac{\{A(m,n)-\overline{A}\}\{B_{i,j}(m,n)-\overline{B}\}}{\sigma_A \sigma_B}, \quad i,j \in \{0,1,2,3,4\},$$

where $\overline{A}$ and $\sigma^2_A$ are the mean and variance of the pixel values in the template A, respectively, and $\overline{B}$ and $\sigma^2_B$ are the mean and variance of the pixel values in a subregion, $B_{ij}$, of the test candidate B at a shift value (i,j), respectively. The mean and variance of the pixel values in regions A and $B_{ij}$ are defined by the following equations:

$$\overline{A} = \frac{1}{MN}\sum_{m=1}^{M}\sum_{n=1}^{N}A(m,n),$$

$$\sigma_B^2 = \frac{1}{MN}\sum_{m=1}^{M}\sum_{n=1}^{N}\{B_{i,j}(m,n)-\overline{B}\}^2.$$

$$\overline{B} = \frac{1}{MN}\sum_{m=1}^{M}\sum_{n=1}^{N}B_{i,j}(m,n),$$

$$\sigma_A^2 = \frac{1}{MN}\sum_{m=1}^{M}\sum_{n=1}^{N}\{A(m,n)-\overline{A}\}^2,$$

The largest cross-correlation value among all shift values was then determined as the cross-correlation value between the template and the test candidate. Next, the cross-correlation values for the test candidate with all of the nodule templates were computed, and the maximum cross-correlation value was determined, and employed as a unique feature of the test candidate, which indicates the extent of the resemblance to the nodule. Similarly, the maximum cross-correlation value for the test candidate with the non-nodule template set was determined and used as another unique feature of the test candidate. which indicates the extent of the resemblance to the non-nodule. These two features for the candidates in the test set were then employed for distinguishing false positives from nodules, when the maximum cross-correlation values with the non-nodule templates was larger than that with the nodule templates.

Creation of Nodule Templates and Non-nodule Templates

A key factor for the success of the multiple-templates matching technique is the number of templates available for nodules and non-nodules. In this study, only 108, which were selected from the 116 nodules initially detected by our CAD scheme for nodule detection nodules, were used as nodule templates. Although any ROIs in a chest radiograph that do not contain a nodule can theoretically be considered as a non-nodule template, as non-nodule templates, the 3077 false positives were selected from the 4875 false positives initially detected by the preexisting CAD scheme because they were considered to be "typical" non-nodules. The following three methods were then utilized to increase the number of templates in this study:

(1) Right/left reversing of a template to create a mirror template,
(2) scaling of a template by three different factors of 0.6, 0.8, and 1.2,
(3) rotation of a template by two different angles, −10 and +10 degrees. The ROIs obtained directly from the original images were called original templates, and those obtained by right/left reversing, scaling, or rotation of an original template were called derived templates. It should be noted that additional derived templates can be created by scaling with additional factors and also by rotation with additional angles.

The right/left reversing enables a template in the right lung to be useful in the left lung and vice versa, and it doubles the number of templates. The scaling and the rotation in this study increased the number of templates by factors of four and three, respectively, and thus the total number of templates can be increased 24 times by a combination of all of these methods.

Figure 8:
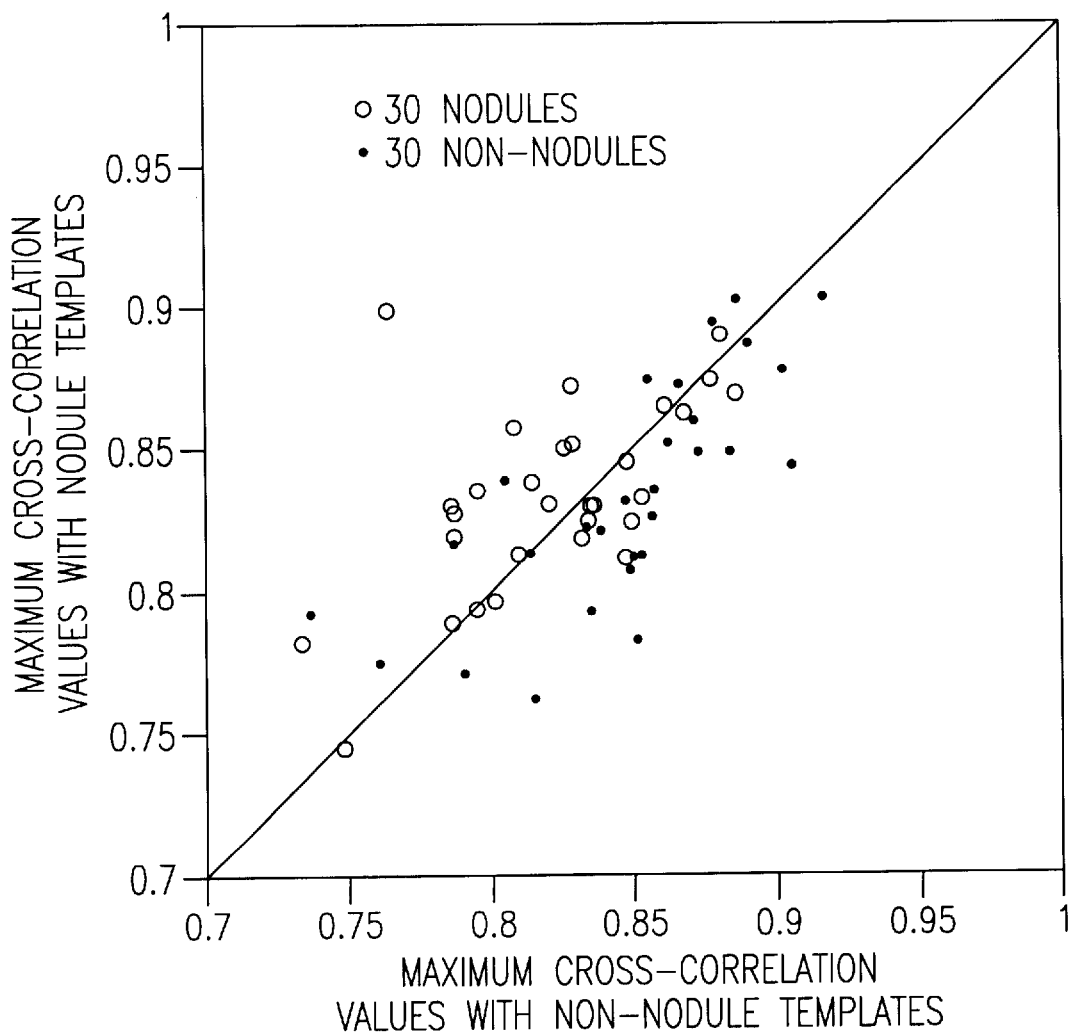
FIG. 8 is a graph illustrating the relationship between the maximum cross-correlation values with 108 nodule templates and 178 non-nodule templates, for 60 randomly selected candidates.

FIG. 8 shows the relationship between the maximum cross-correlation values with 108 nodule templates and 178 non-nodule templates in the small template set for 60 candidates in the small test set. As has been described previously, the templates were carefully selected from typical nodules and non-nodules. It is apparent in FIG. 8 that, although there is considerable overlap, nodules tend to have larger maximum correlation values with nodule templates, whereas non-nodules do so with non-nodule templates, i.e., nodules tend to be above the 45-degree line and non-nodules below the 45-degree line. This general trend indicates the usefulness of the multiple-templates matching technique in distinguishing between nodules and non-nodules. However, many test candidates have relatively low cross-correlation values with either nodule or non-nodule templates, which indicates that there were not enough templates, in the template set for nodules or non-nodules, which are very similar to those test candidates.

Figure 9A:
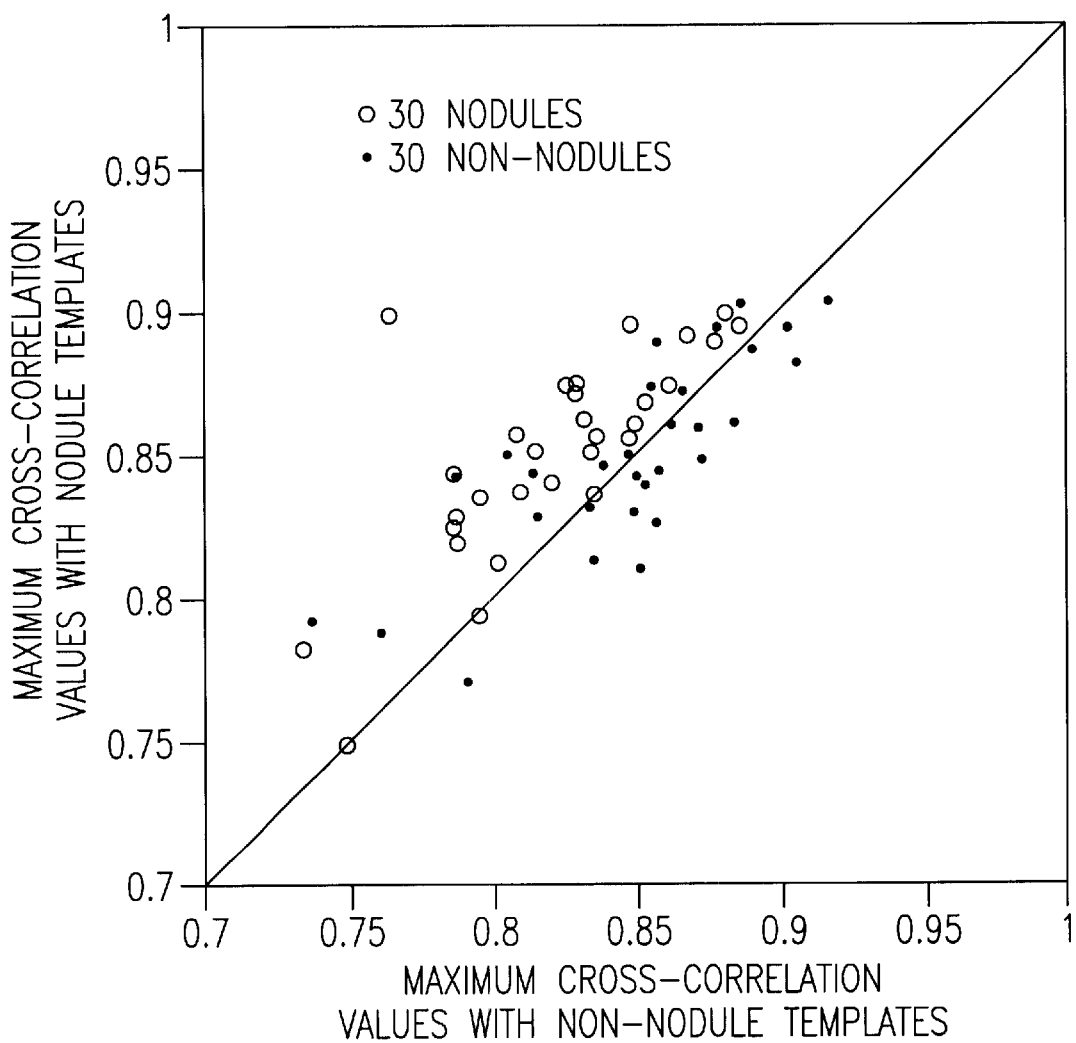
FIGS. 9(a), 9(b) and 9(c) are graphs illustrating the relationship between the maximum cross-correlation values with nodule templates and non-nodule templates, for 60 randomly selected candidates with (a) mirror nodule templates (216 nodule and 178 non-nodule templates), (b) mirror non-nodule templates (108 nodule and 356 non-nodule template), and (c) mirror templates for both nodules and non-nodules (216 nodule and 356 non-nodule template), respectively
Figure 9B:
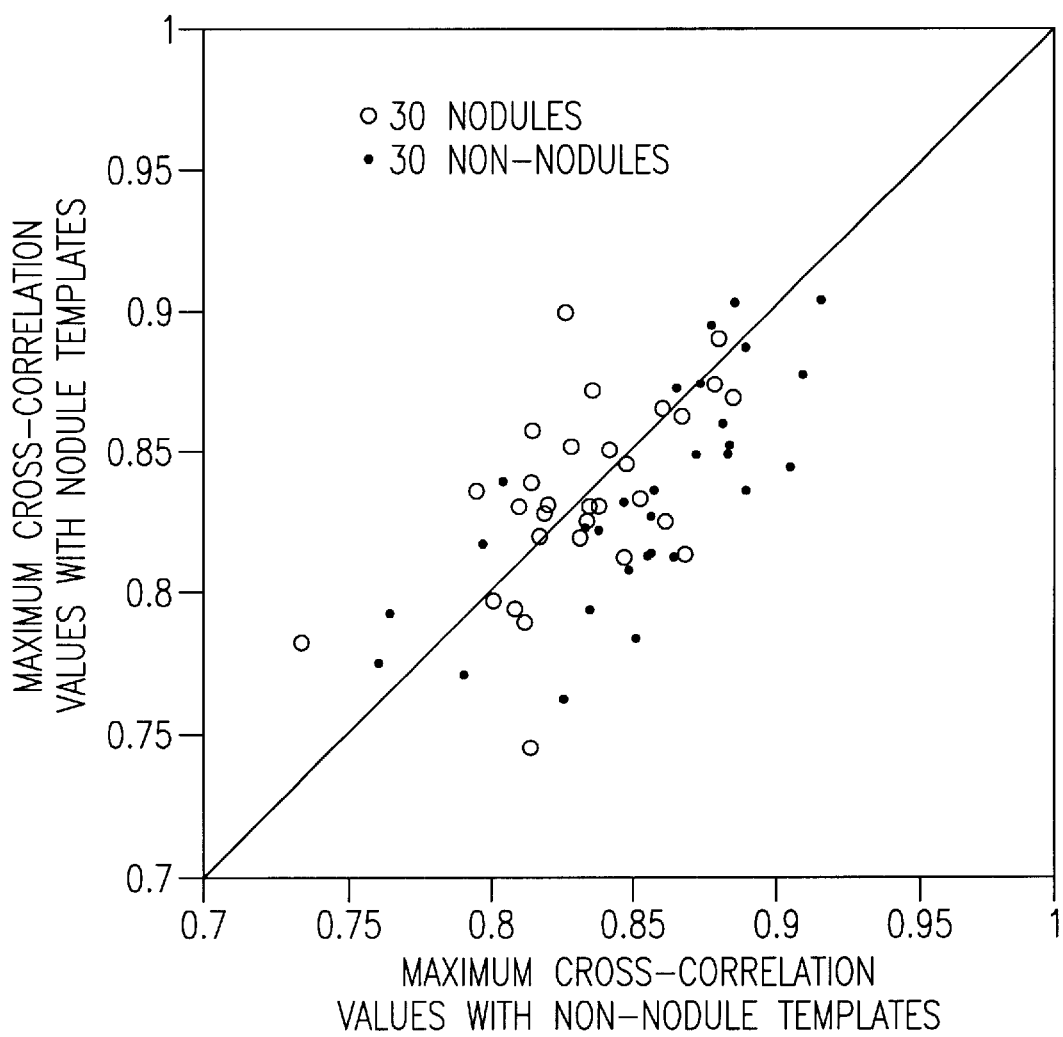
Figure 9C:
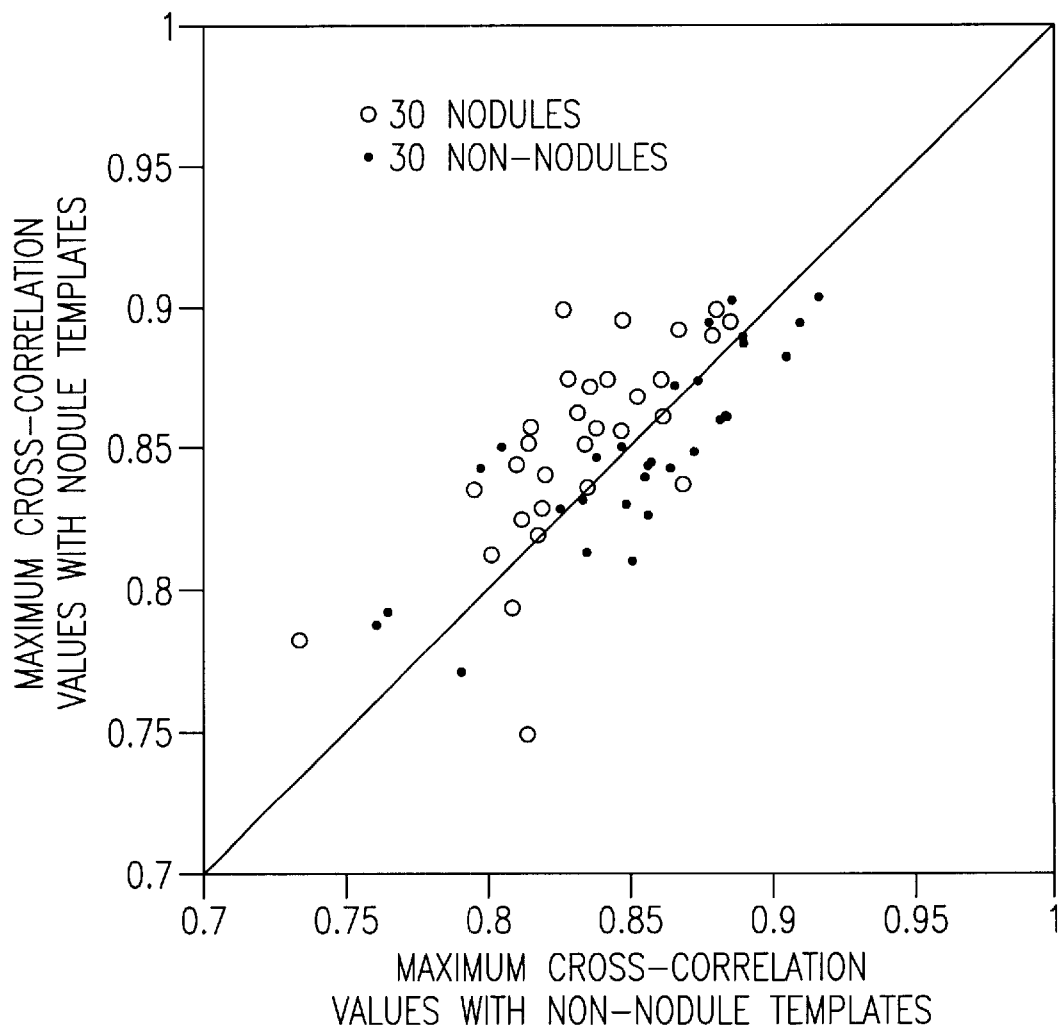

FIG. 9 shows the relationship between the maximum cross-correlation values with the nodule templates and non-nodule templates for the 60 test candidates, when additional templates were incorporated based on (a) mirror nodule templates only, (b) mirror non-nodule templates only, and (c) mirror templates for both nodules and non-nodules. When FIG. 8 and FIG. 9(a) are compared, it is clear that most test candidates have moved upward in FIG. 9(a), and thus the maximum cross-correlation values with nodule templates for these test candidates were increased by the use of mirror templates for nodules. In addition, nodules are located on or above the diagonal line in FIG. 9(a), and thus some non-nodules below the diagonal line can be clearly distinguished from nodules. Similarly, it was observed that most test candidates have moved to the right in FIG. 9(b), compared with FIG. 8, and thus the use of mirror templates for non-nodules increased the maximum cross-correlation values with non-nodule templates. It is apparent in FIG. 9(c) that the test candidates have moved upward and to the right, and the maximum cross-correlation values with both nodule and non-nodule templates were increased by use of mirror templates.

Figure 10:
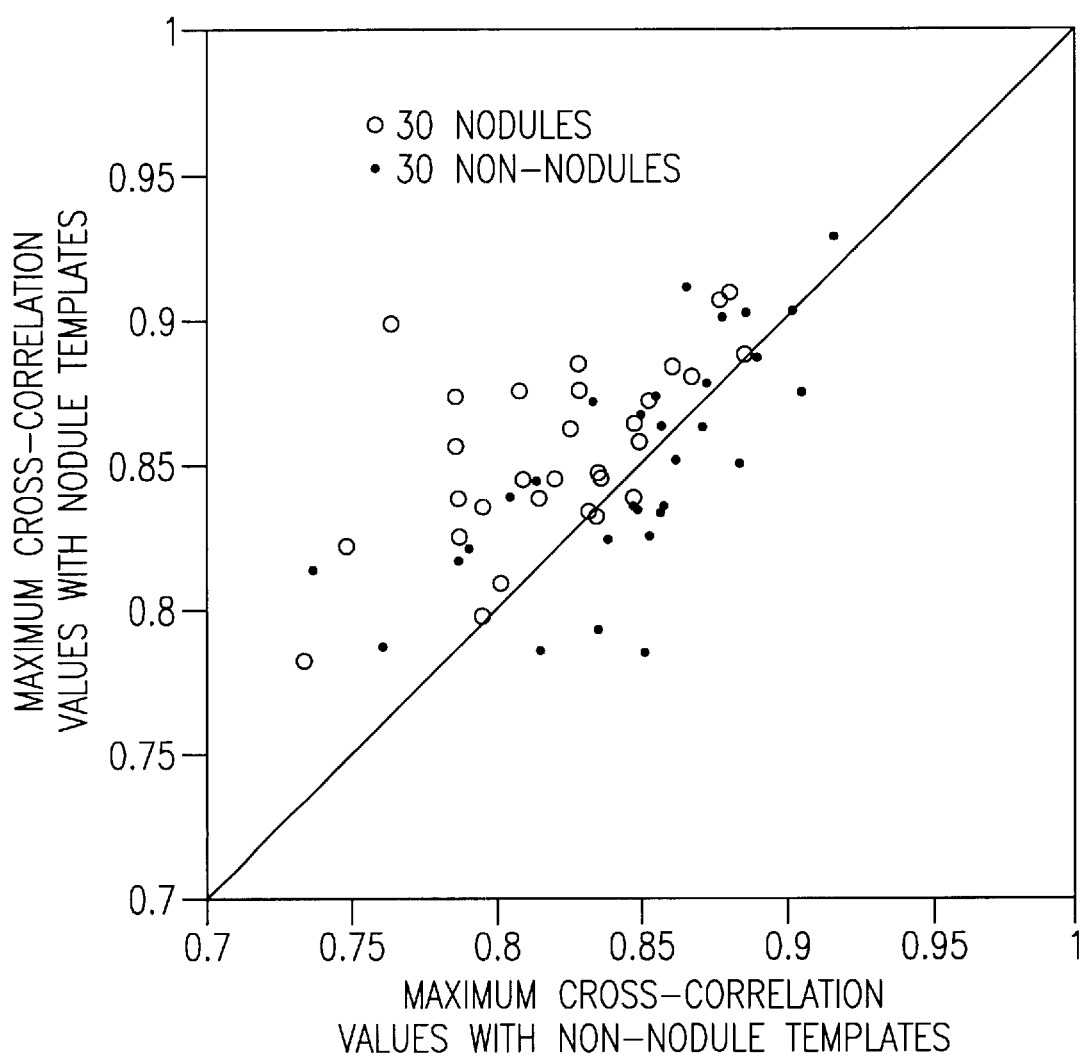
FIG. 10 is a graph illustrating the relationship between the maximum cross-correlation values with 432 nodule templates and 178 non-nodule templates, for 60 randomly selected candidates, with scaling of the nodule templates.

Although the scaling may obscure a template in some cases, it was still applied to the nodule templates because the study had only a very limited number of nodules. FIG. 10 demonstrates the relationship between the maximum cross-correlation values with the nodule templates and non-nodule templates, together with scaled nodule templates. When the results in FIG. 10 are compared with the results without scaled nodule templates in FIG. 8, it is apparent that the addition of scaled nodule templates resulted in improved maximum cross-correlation values with nodule templates for the test candidates, and also improved distinction between nodules and non-nodules, because most nodules are above the diagonal line.

Figure 11A:
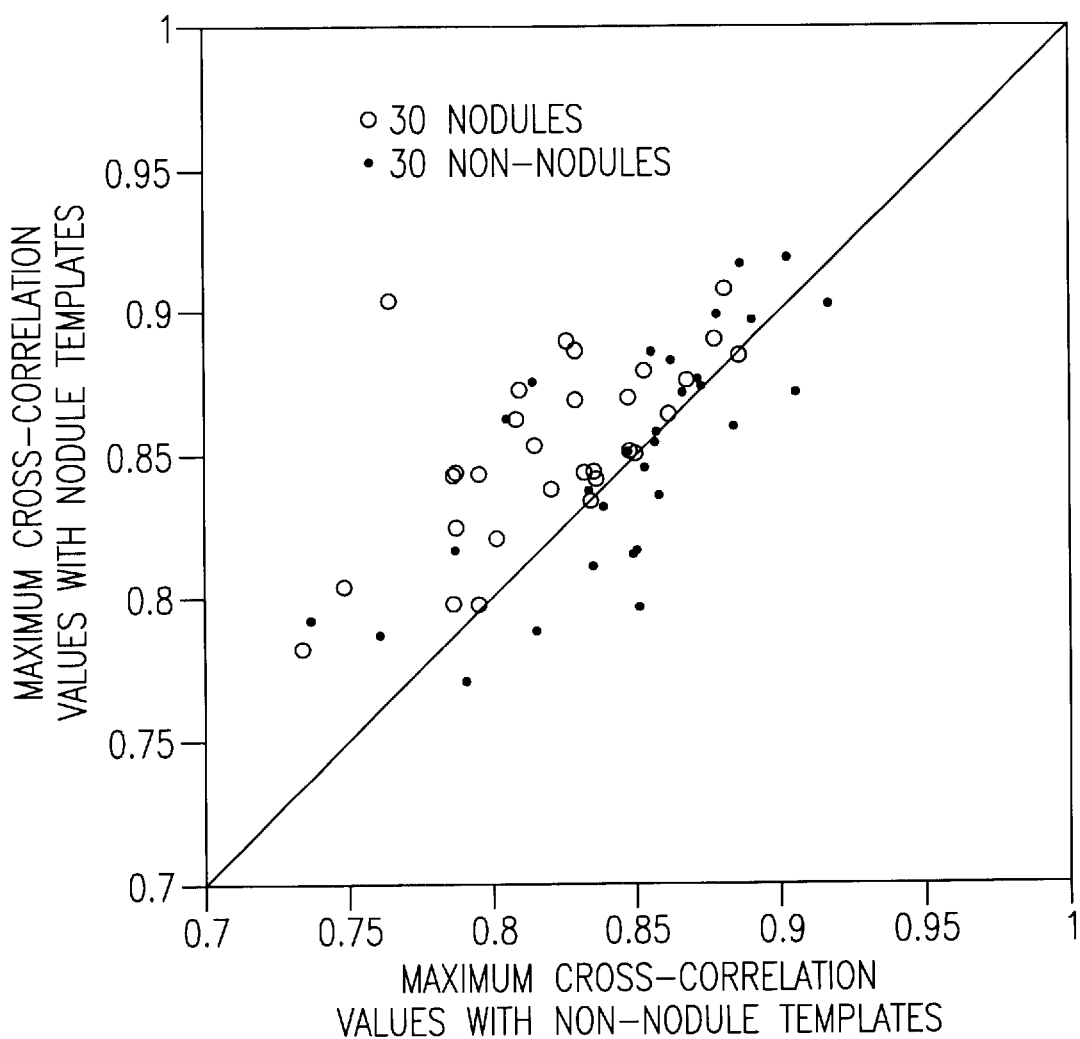
FIGS. 11(a), 11(b) and 11(c) are graphs illustrating the relationship between the maximum cross-correlation values with nodule templates and non-nodule templates, for 60 randomly selected candidates with (a) rotation of nodule templates (324 nodule and 178 non-nodule templates), (b) rotation of non-nodule templates (108 nodule and 534 non-nodule templates), and (c) rotation of the nodule and non-nodule templates (324 nodule and 534 non-nodule templates), respectively.
Figure 11B:
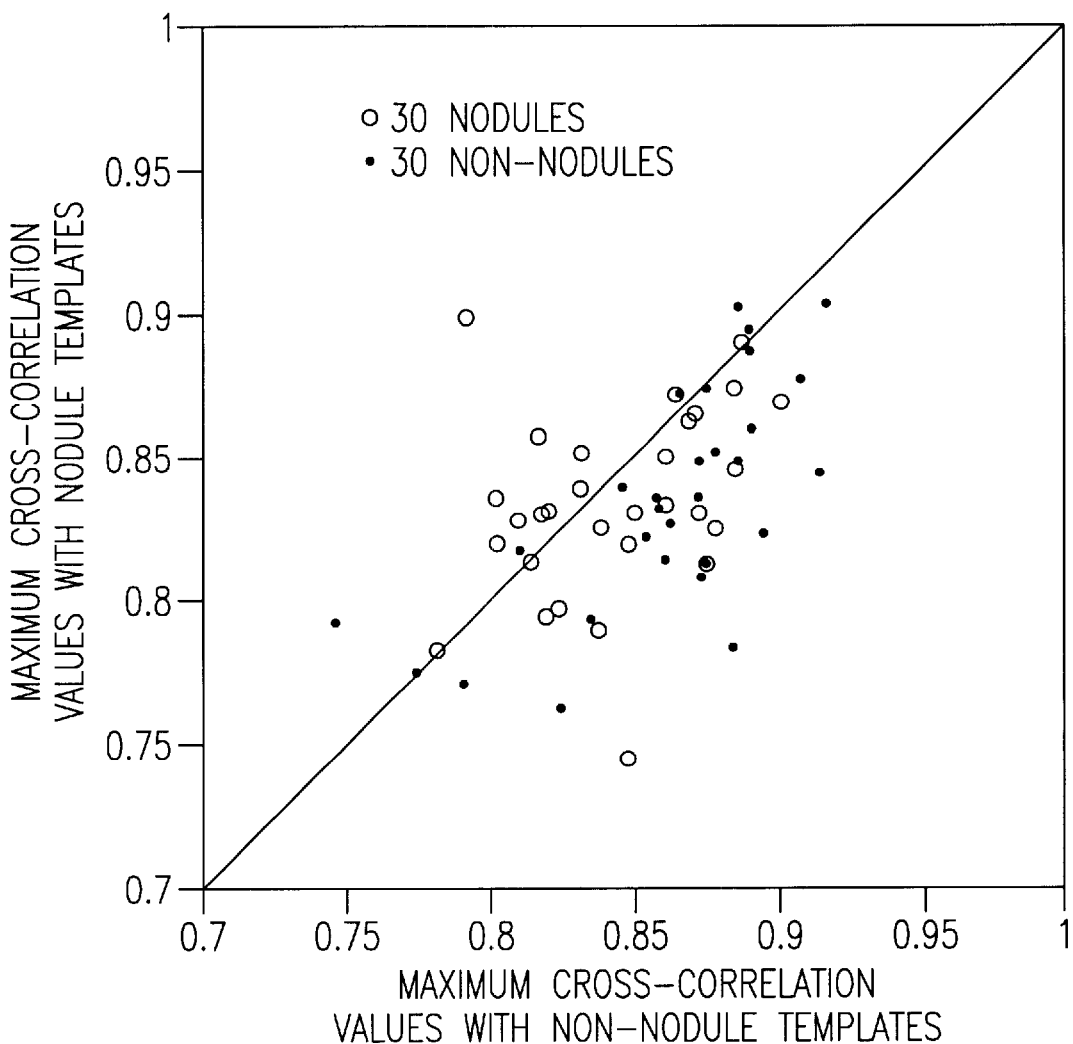
Figure 11C:
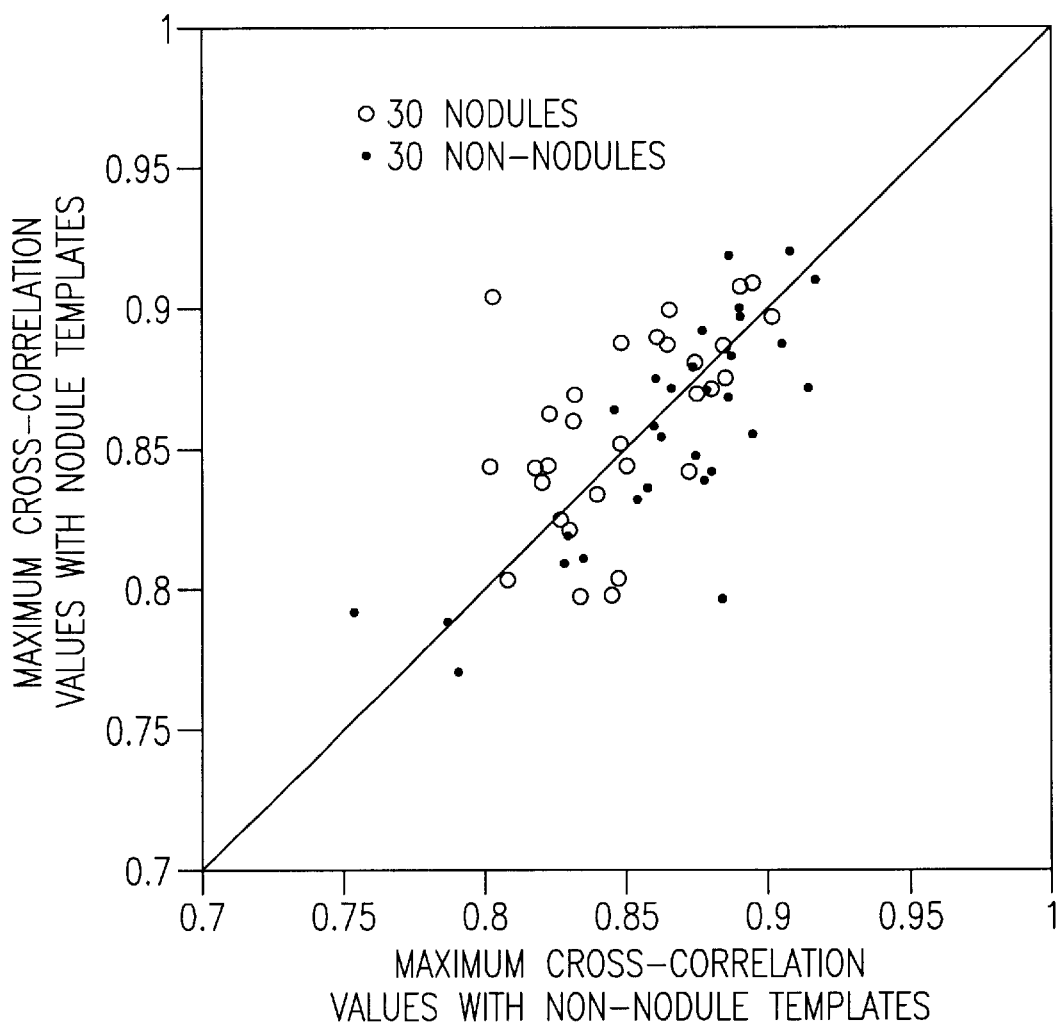

On the other hand, unlike scaling, the rotation was applied to all of the nodule and non-nodule templates. FIG. 11 shows the relationship between the maximum cross-correlation values with the nodule templates and non-nodule templates, when additional templates were created by (a) rotation of the nodule templates only, (b) rotation of the non-nodule templates only, and (c) rotation of both nodule and non-nodule templates; results without rotated templates are shown in FIG. 8. Again, the maximum cross-correlation values with the nodule templates and non-nodule templates became larger by addition of rotated templates.

Another parameter for the multiple-templates matching technique is an appropriate choice of the matrix sizes for the templates and the test candidates. In this study, the effect of various matrix sizes ranging from 24×24 pixels to 48×48 pixels on the overall performance was examined. It was found that the best results were obtained when the matrix sizes for the templates and the test candidates were 36×36 pixels (approximately 25×25 $mm^2$) and 40×40 pixels (28×28 $mm^2$), respectively.

Figure 12A:
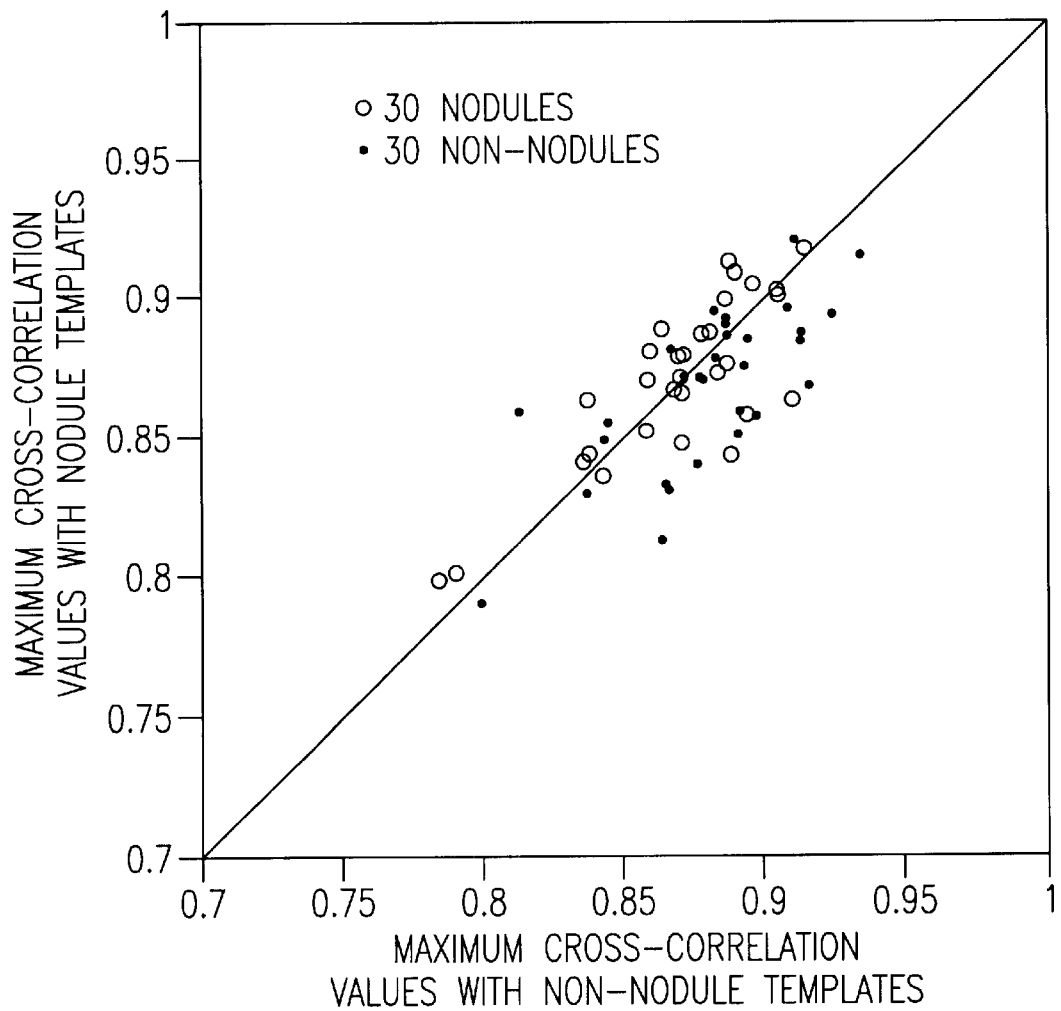
FIGS. 12(a), 12(b) and 12(c) are graphs illustrating the relationship between the maximum cross-correlation values with 216 nodule templates and 356 non-nodule templates, for 60 randomly selected candidates when the matrix size of templates is equal to (a) 24×24, (b) 36×36, and (c) 48×48 pixels, respectively.
Figure 12B:
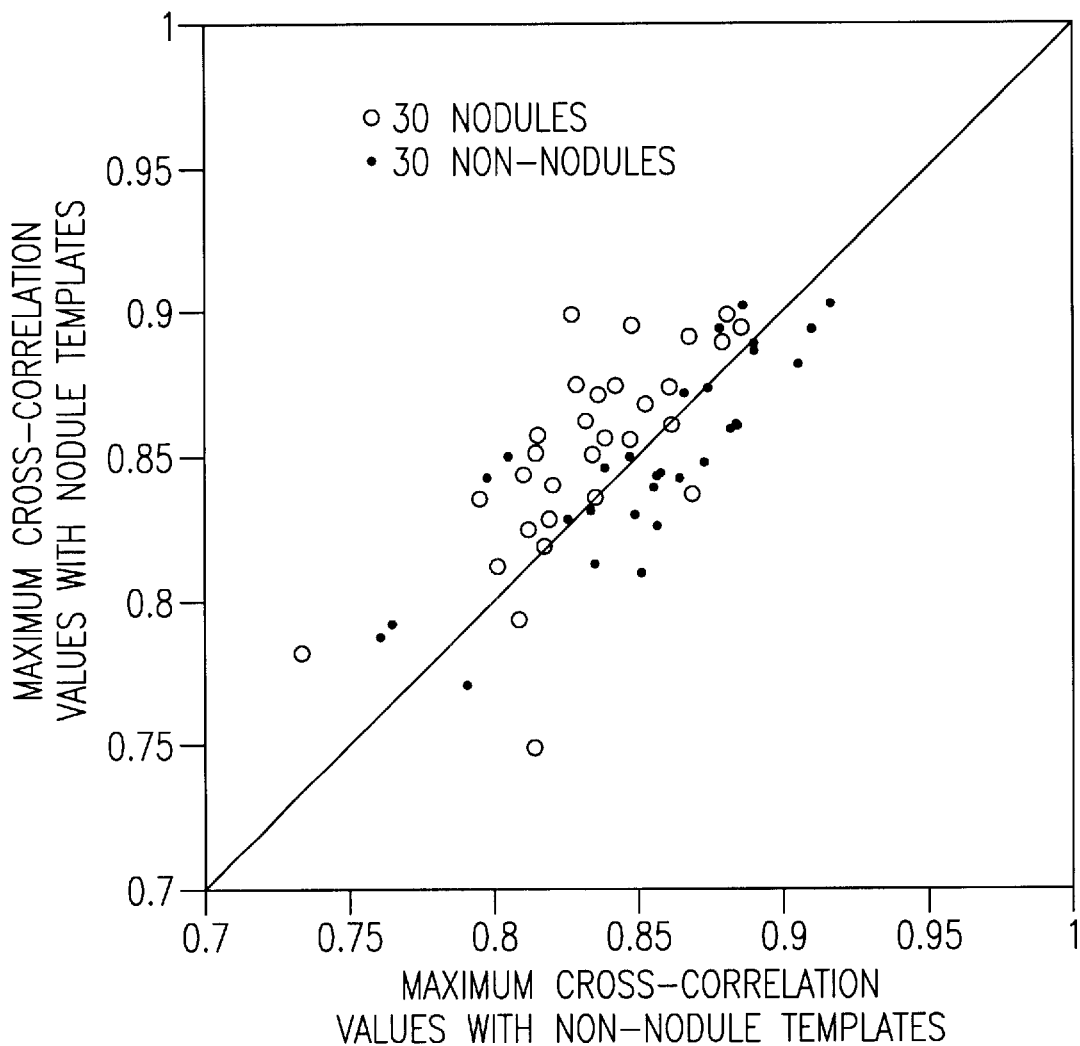
Figure 12C:
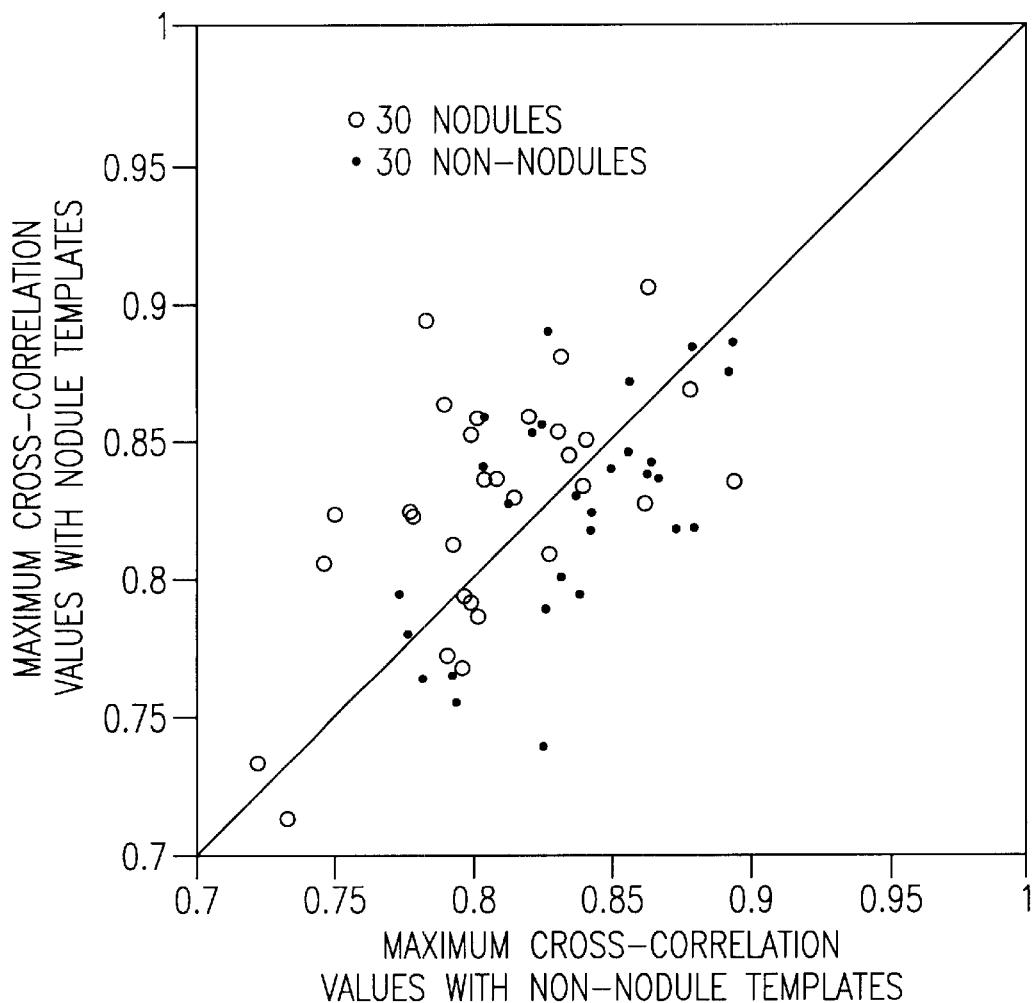

FIGS. 12(a), (b), and (c) show the relationship between the maximum cross-correlation values with the nodule templates and non-nodule templates for 60 candidates, when the matrix size of templates was 24×24, 36×36, and 48×48 pixels, respectively. The templates used included 108 nodules and 178 non-nodules, together with their mirror templates. Although the maximum cross-correlation values were generally large, with a matrix size of 24×24 pixels, the overlap of the correlation values between the nodules and non-nodules was large as well, which is not useful for the separation of nodules and non-nodules. On the other hand, when the matrix size was 48×48 pixels, the maximum cross-correlation values were usually low and could not be used as reliable features. It is apparent from FIG. 12 that the best separation between the 30 nodules and 30 non-nodules was achieved when the matrix size of the templates was 36×36 pixels. Therefore, the matrix size of the templates used in this study was determined as 36×36 pixels.

Elimination of Nodule-like Non-nodules in Non-nodule Template Set

Figure 13:
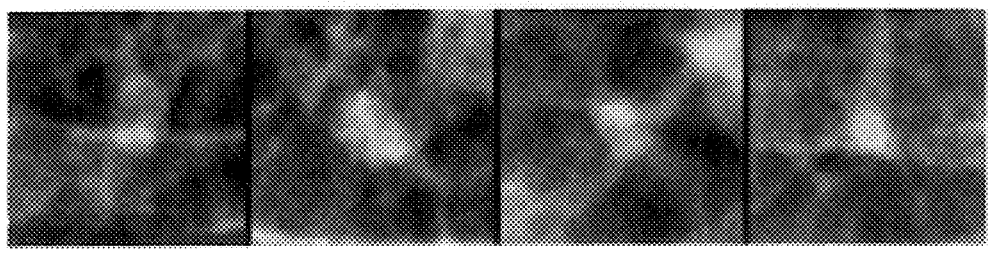
FIG. 13 is an illustration of examples of nodule-like non-nodule templates.

It is important to note that not all non-nodule templates can make a useful contribution to the improvement in the performance of the multiple-templates matching technique. In fact, many non-nodule templates do impair the performance of the multiple-templates matching technique. As can be seen in FIG. 9(c), there are 4 nodules located below the diagonal line, which implies that these nodules are more similar to some non-nodule templates used than to all of the nodule templates. FIG. 13 illustrates examples for such non-nodule templates that pulled some nodules below the diagonal line by increasing the maximum correlation values of nodules with non-nodule templates. It was found that these non-nodule templates typically resembled nodules in appearance. Therefore, it is desirable to eliminate these nodule-like non-nodule templates in order to achieve a good performance for the multiple-templates matching technique. The nodules in the training set and in a supplemental database were employed to achieve this task.

In addition to the main database described previously, another supplemental database was also employed solely for creation of more nodule templates and for training of the multiple-templates matching technique, but not for the verification of the present CAD scheme with the multiple-templates matching technique, because the characteristics of the chest images in the supplemental database are quite different from those in the main database. The supplemental database included 128 chest images with solitary lung nodules, which were selected from a total of 154 nodule cases in the Japanese Standard Digital Image Database developed by the Japanese Society of Radiological Technology. [10] Twenty-six nodule cases were eliminated from the Japanese standard database, each of which contained a nodule with a subtlety rating score of either one or five, corresponding to an extremely subtle nodule or an obvious nodule, respectively. The original chest images were digitized with a 0.175 mm pixel size, a matrix size of 2048× 2048, and 12-bit gray levels. In this study, the matrix size was reduced to 512×512 by subsampling of the original image data by a factor of 4, and the number of gray levels was decreased to 10 bits, in order to be consistent with the chest images in the main database. The 128 nodules in the supplemental database together with the 108 nodules in the main database were used as the nodule template set hereafter for verification of the multiple-templates matching technique. The 128 nodules were also employed for training of the multiple-templates matching technique, namely, for the removal of nodule-like non-nodule templates.

As the first step in training for the multiple-templates matching technique, for each of the 128 nodules, twenty non-nodule templates which provided the 20 largest cross-correlation values with the nodule were considered here to be nodule-like non-nodules, and were eliminated from the 4,875 original templates in the initial non-nodule template set. A total of 1,338 original non-nodule templates were thus removed, and 3,537 original non-nodule templates remained in the non-nodule template set. Similarly, the 44 nodules in the training set were employed for further elimination of nodule-like non-nodules from the 3,537 original templates. Thus, 460 original non-nodule templates were again eliminated, and finally, 3,077 original templates were left in the non-nodule template set. A total of 1,798 templates were removed from the initial non-nodule template set by employing the 128 nodules in the supplemental database and the 44 nodules in the training set altogether. For the removal of nodule-like non-nodules in the template set, the 20 largest cross-correlation values were empirically employed as the threshold. However, it is possible to employ a different number of largest cross-correlation values, depending on the number and characteristics of templates available.

Figure 14:
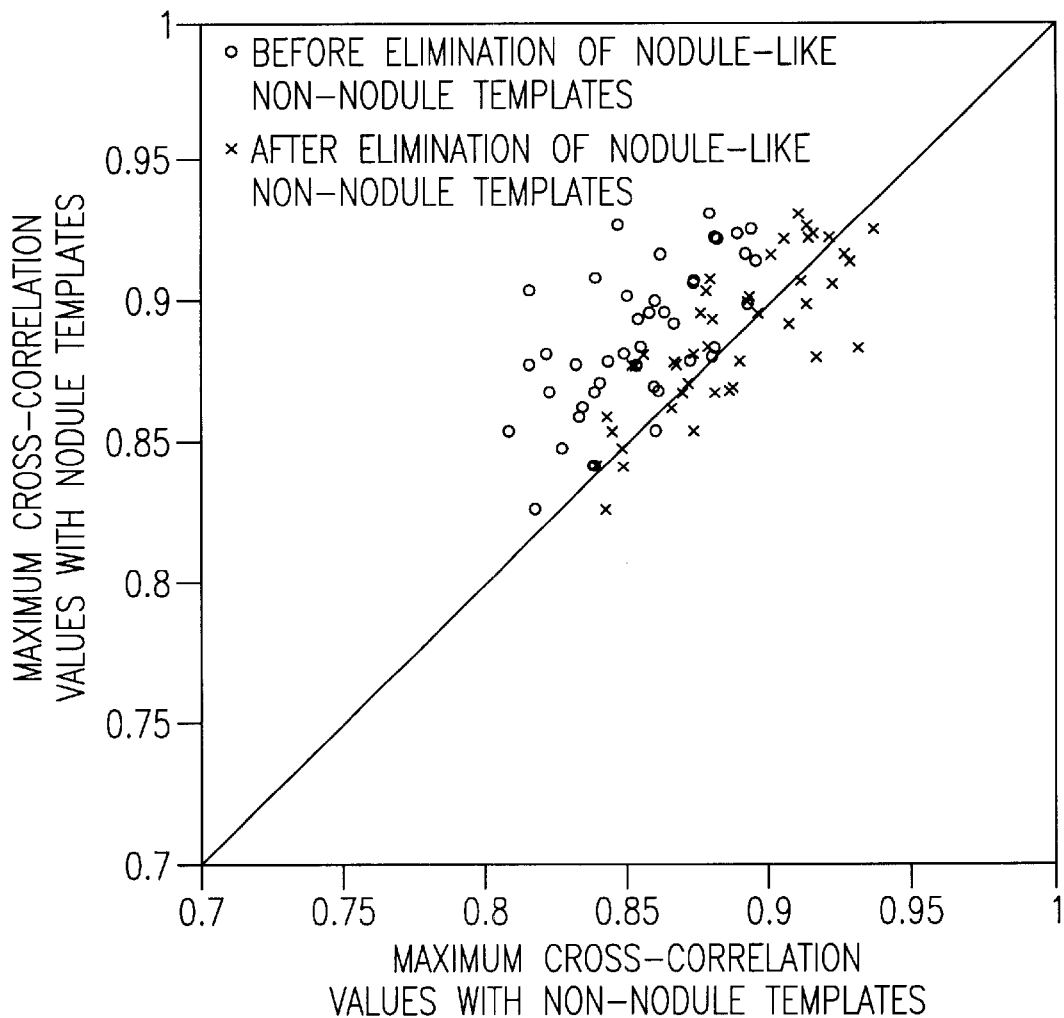
FIG. 14 is a graph illustrating the relationship between the maximum cross-correlation values with nodule templates and non-nodule templates, for the 44 nodules in the test set, before (x's) and after (circles) the elimination of nodule-like non-nodule templates.

In order to demonstrate how we improved the performance of the multiple-templates matching technique by elimination of the nodule-like non-nodules, FIG. 14 shows the relationship between the maximum cross-correlation values with the nodule templates and non-nodule templates for the 44 nodules in the test set, before (indicated by x's) and after (indicated by circles) the removal of the nodule-like non-nodule templates. The nodule template set used in FIG. 14 was composed of 5,664 (24×236) templates, which included the 108 nodules in the main database and the 128 nodules in the supplemental database, and their mirror templates, scaled templates, and rotated templates. Note that the non-nodule template set contained 29,250 (6×4,875) templates and 18,462 (6×3077) templates, respectively, before and after the removal of the nodule-like non-nodule templates, which included the original non-nodule templates, their mirror templates, and rotated templates. It is apparent in FIG. 14 that most nodules are moved significantly to the left by elimination of the nodule-like non-nodule templates, and that all but one nodule are located above the diagonal line, as can be predicted.

Figure 15:
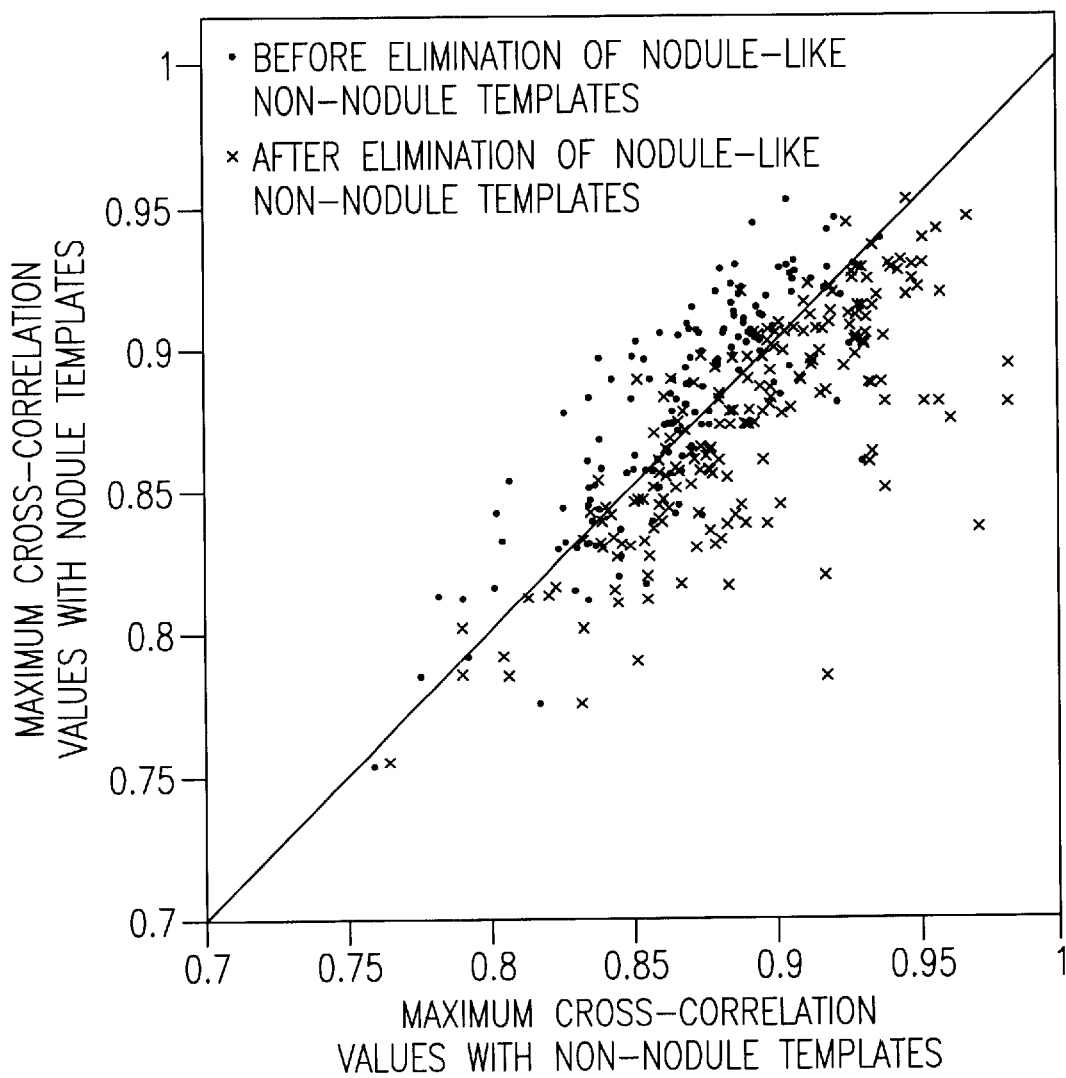
FIG. 15 is a graph illustrating the relationship between the maximum cross-correlation values with nodule templates and non-nodule templates, for half (189) of the 377 non-nodules in the test set, before (x's) and after (dots) the elimination of nodule-like non-nodule templates.

It should be noted that the elimination of nodule-like non-nodule templates would also affect the non-nodules in the test set. FIG. 15 shows the relationship between the maximum cross-correlation values with the nodule templates and non-nodule templates, for one half (189) of the 377 non-nodules in the test set, before (indicated by x's) and after (indicated by dots) the elimination of the non-nodule templates. Note that there were 5,664 templates in the nodule template set, and 29,250 and 18,462 templates in the non-nodule template set, respectively, before and after the elimination of nodule-like non-nodule templates. Only half of the non-nodules are shown in FIG. 15 for a clearer display. The nodule template set and non-nodule template sets used in FIG. 15 are the same as those employed in FIG. 14. It is apparent in FIG. 15 that, although some of the 377 non-nodules moved to the left as did the nodules in FIG. 14, many non-nodules still remain below the diagonal line after the elimination of the nodule-like non-nodule templates. This findings implies that, after elimination of nodule-like non-nodule templates, it is possible to distinguish the false positives (non-nodules) below the diagonal line in FIG. 15 from the nodules in FIG. 14, because nearly all of the nodules are located above the diagonal lines.

Figure 16:
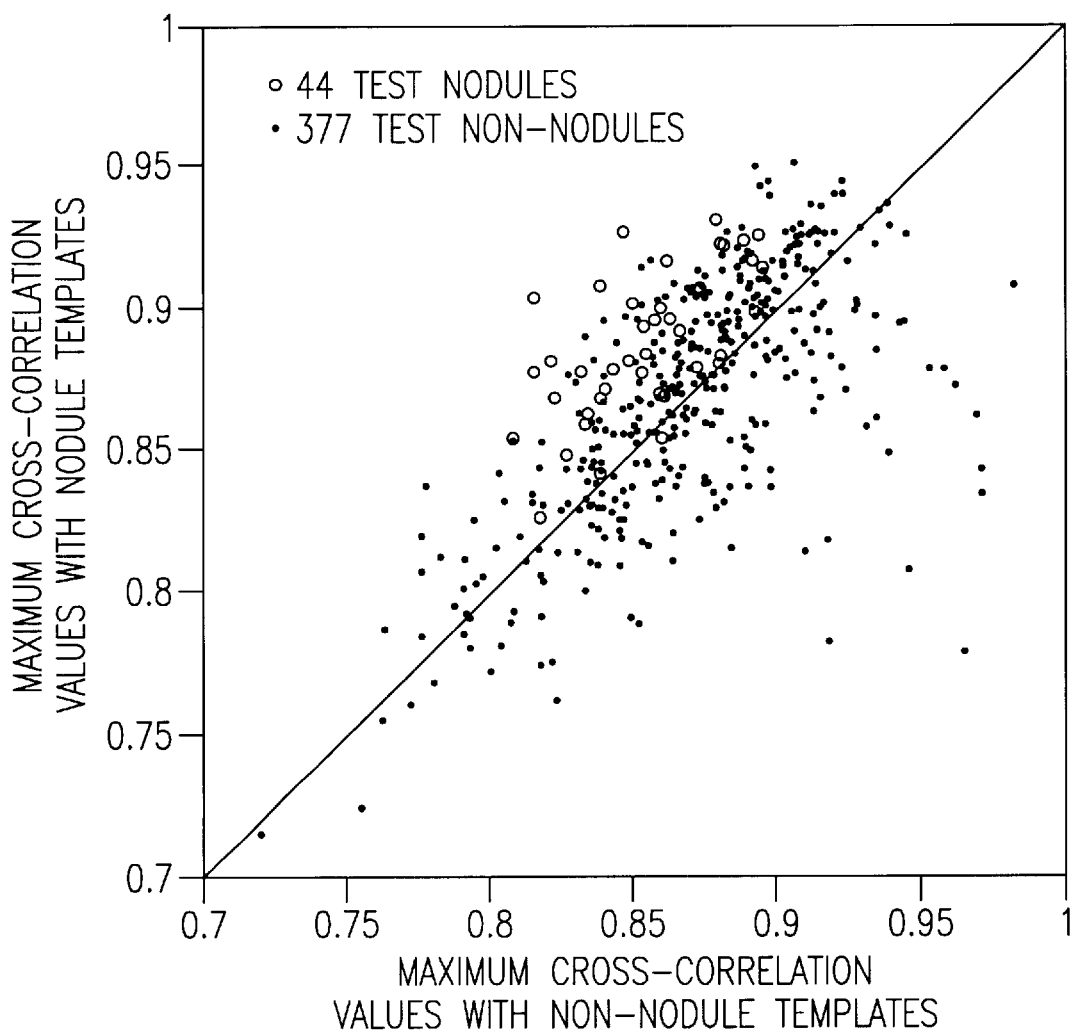
FIG. 16 is a graph illustrating the relationship between the maximum cross-correlation values with 5,664 nodule templates and 18,462 non-nodule templates, for 44 nodules (circles) and 377 non-nodules (dots) in the test set, after the elimination of nodule-like non-nodule templates in a validation test.

With the 5,664 nodule templates and 18,462 non-nodule templates after the elimination of nodule-like non-nodules, a validation test was conducted based on the 44 nodules and 377 non-nodules in the test set. It should be noted that the 44 nodules and 377 non-nodules have not been utilized for training of the multiple-templates matching technique, i.e., for elimination of either nodule-like non-nodules or non-nodule-like nodules in the template set, although the 377 non-nodules were shown in FIG. 15 to demonstrate the effect of removing nodule-like non-nodule templates. FIG. 16 shows the relationship between the maximum cross-correlation values with the 5,664 nodule templates and 18,462 non-nodule templates for the 44 nodules and 377 non-nodules in the test set. It is apparent in FIG. 16 that a significant distinction can be made between the nodules and false positives (non-nodules) based on the two maximum cross-correlation values. For example, if the diagonal line is used as a threshold, namely, if candidates located above the diagonal line are accepted as nodules, then we can eliminate 167 (44.3%) false positives from the 377 non-nodules with a reduction of only one (2.3%) true nodule. This actually constitutes a significant improvement of the existing CAD scheme because many of the 377 false positives are similar to nodules in appearance. and are thus considered as "difficult" false positives.

The multiple-templates matching technique requires a relatively large amount of computer time because cross-correlation values are computed with a large number of templates. For example, 24,126 (5,664+18,462) templates were used in the final validation test, which requires about 85 seconds to calculate the cross-correlation values for each of the test candidates on a personal computer with an Intel Pentium-III 733 MHZ CPU and a Linux operating system. In the future, the inventors plan to expand their database greatly in order to achieve a higher performance and reliability, which, in turn, implies a larger template set and more computer time required for computing the cross-correlation values. However, this will not be a serious problem for the multiple-templates matching technique, because this technique is applied solely in the final step of the CAD scheme, which, on average, reports only three or four nodule candidates per chest image. Moreover, computers are, and will be, becoming faster and faster, and thus will significantly reduce the problem caused by the large computational burden of the multiple-templates matching technique. At present, it takes about 5–6 minutes to process each of the chest images for removal of some false positives by use of the multiple-templates matching technique.

Application to Computed Tomography

In order to demonstrate that the multiple-templates matching technique has the potential to distinguish false positives from nodules in a CAD scheme for nodule detection on computed tomography (CT), a pilot study was conducted to apply the multiple-templates matching technique to a database of 44 CT scans, which contain a total of 237 nodules. The CT scans were obtained with 10 mm collimation, and 10 mm reconstruction intervals. Each CT slice has a matrix size of 512×512 pixels and a gray level range of 10 bits. The field of view was optimized for each patient during the examination so that the pixel sizes in the database ranged from 0.566 to 0.781 mm.

An existing CAD process [13] at the University of Chicago Department of Radiology for CT nodule detection first segmented lungs from background in each slice by using a thresholding technique and a rolling-ball algorithm. A multiple gray-level thresholding technique was then applied to the segmented lung areas for detection of initial nodule candidates. For each of the initial nodule candidates, six geometric features (volume, sphericity, radius of equivalent sphere, maximum compactness, maximum circularity, and maximum eccentricity) and three gray level features (mean gray level, standard deviation of gray level, and the gray level threshold at which the nodule candidate was first detected) were determined, and were employed for distinguishing false positives from nodules. With this CAD scheme, 208 (87.8%) nodules and 4923 false positives (approximately three false positives per slice) were reported as nodule candidates.

Figure 17:
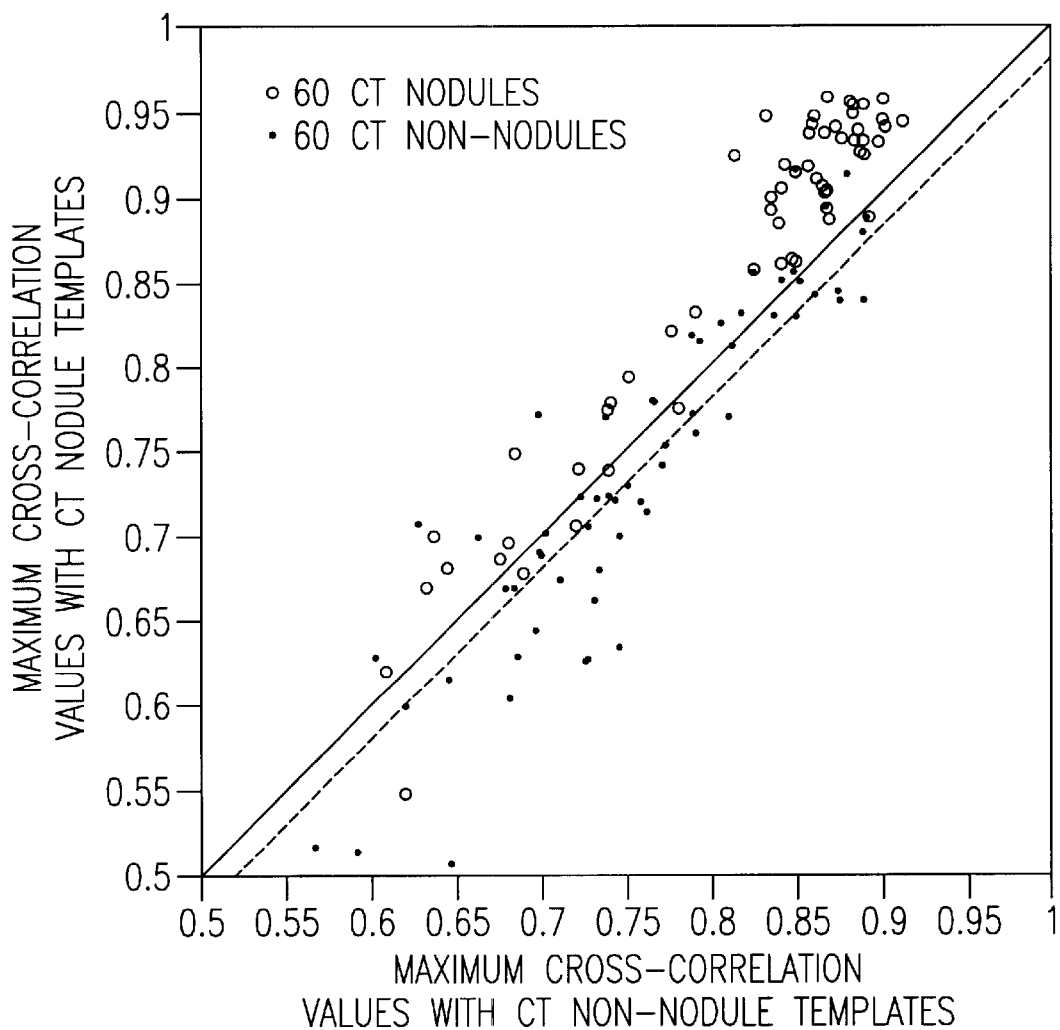
FIG. 17 is a graph illustrating the relationship between the maximum cross-correlation values with 1,440 CT nodule templates and 1,440 CT non-nodule templates, for 60 CT nodules (circles) and 60 CT non-nodules (dots).

The 208 nodules and 200 false positives, which were randomly selected from the 4923 false positives, were first chosen for construction of a basis for applying the multiple-templates matching technique to the CT nodule detection scheme. In this study, only those nodules and non-nodules that were distant from the boundaries of lung areas were manually selected, so that the templates obtained from these candidates were completely contained inside the lungs. Sixty nodules and sixty non-nodules were thus obtained from the 208 nodules and 200 non-nodules, respectively, and were used as both templates and test candidates. A leave-one-out (round robin) test method was employed so that a test candidate and the corresponding derived templates were not included in the template set used for testing. With the multiple-templates matching technique described above, the maximum cross-correlation values for 60 nodules (circles)

and 60 non-nodules (dots) were obtained by use of 1,440 (24×60) nodule templates and 1,440 (24×60) non-nodule templates, as shown in FIG. 17. The 1,440 nodule templates and 1,440 non-nodule templates were obtained, respectively, from the 60 nodules and 60 nodules by use of mirror templates, scaled templates, and rotated templates. The dashed line was used as a threshold for distinction between nodules and non-nodules.

It is apparent in FIG. 17 that nodules tend to be located above the diagonal line, whereas non-nodules tend to be located below the diagonal line, which indicates that nodules are generally more similar to nodule templates, and non-nodules are generally more similar to non-nodule templates. It is important to note in FIG. 17 that many nodules have very large cross-correlation values with nodule templates, and thus they are distributed above the diagonal line and around the upper-right corner, which implies that each of these nodules has at least one similar nodule template in the template set. It is thus believed that there is a larger probability to find two similar nodules in CT scans than in chest radiographs, because of the simpler background structures in CT scans. If the dashed line is used as a threshold, that is, if those candidates above the dashed line are accepted as nodules and those candidates below the dashed line are accepted as non-nodules, then 29 (48.3%) false positives (non-nodules) can be eliminated with a reduction of only one (1.7%) nodule. This result indicates that the multiple-templates matching technique has the potential to significantly reduce the number of false positives in the CAD scheme for CT nodule detection, and also in many CAD schemes for detection of many different kinds of lesions, such as masses and microcalcifications in mammograms, breast lesions in ultrasound and magnetic resonance images, colon polyps and liver tumors in abdominal CT images, and aneurysms in brain CT images. In addition, the multiple-templates matching technique can be used to distinguish benign nodules from malignant nodules, in order to improve the performance of CAD schemes for classification between benign lesions and malignant lesions due to many cancers, such as lung cancer, breast cancer, colon cancer, and stomach cancer.

Application to Benign Nodules

A pilot study was also conducted to show that the multiple-templates matching technique can be employed to distinguish benign nodules from malignant nodules in a CAD scheme for nodule classification on digital chest images. A database of 56 chest images, which contained 23 malignant nodules and 33 benign nodules, was used. Each image had a matrix size of 2048×2048 pixels, a pixel size of 0.175 mm, and a gray level range of 10 bits. The location and the size for each of the nodules were identified by three radiologists, and the average values for the location and the size were calculated and used for classification between malignant nodules and benign nodules in chest images, as next discussed.

10 "typical" malignant nodules and 10 "typical" benign nodules were manually selected for distinction of benign nodules from malignant nodules by applying the multiple-templates matching technique. Because the approximate nodule size was known, an original template was first obtained at the location of a nodule with a variable matrix size so that the area of the nodule was approximately half of the area of the template. The matrix size for all the templates was then normalized (reduced or magnified) to 40×40 pixels by use of an image scaling technique. For each of the nodules, the same scaling factor was applied for scaling of the corresponding test candidates, which had the same center location with the corresponding template, and whose matrix size was 48×48 pixels.

Each template was then right/left reversed, rotated by two angles of −10 and +10 degrees, and scaled by two factors of 0.9 and 1.1 in order to correct the inaccuracy of the estimated nodule size by the radiologists. By combining the three techniques for increasing of the number of templates, we obtained 180 (18×10) templates for malignant nodules and 180 (18×10) templates for benign nodules. The background trend was corrected for all the templates and the test candidates prior to the determination of cross correlation values between them. A round robin test method was employed so that a test candidate and the corresponding derived templates were not included in the template set used for testing.

Figure 18:
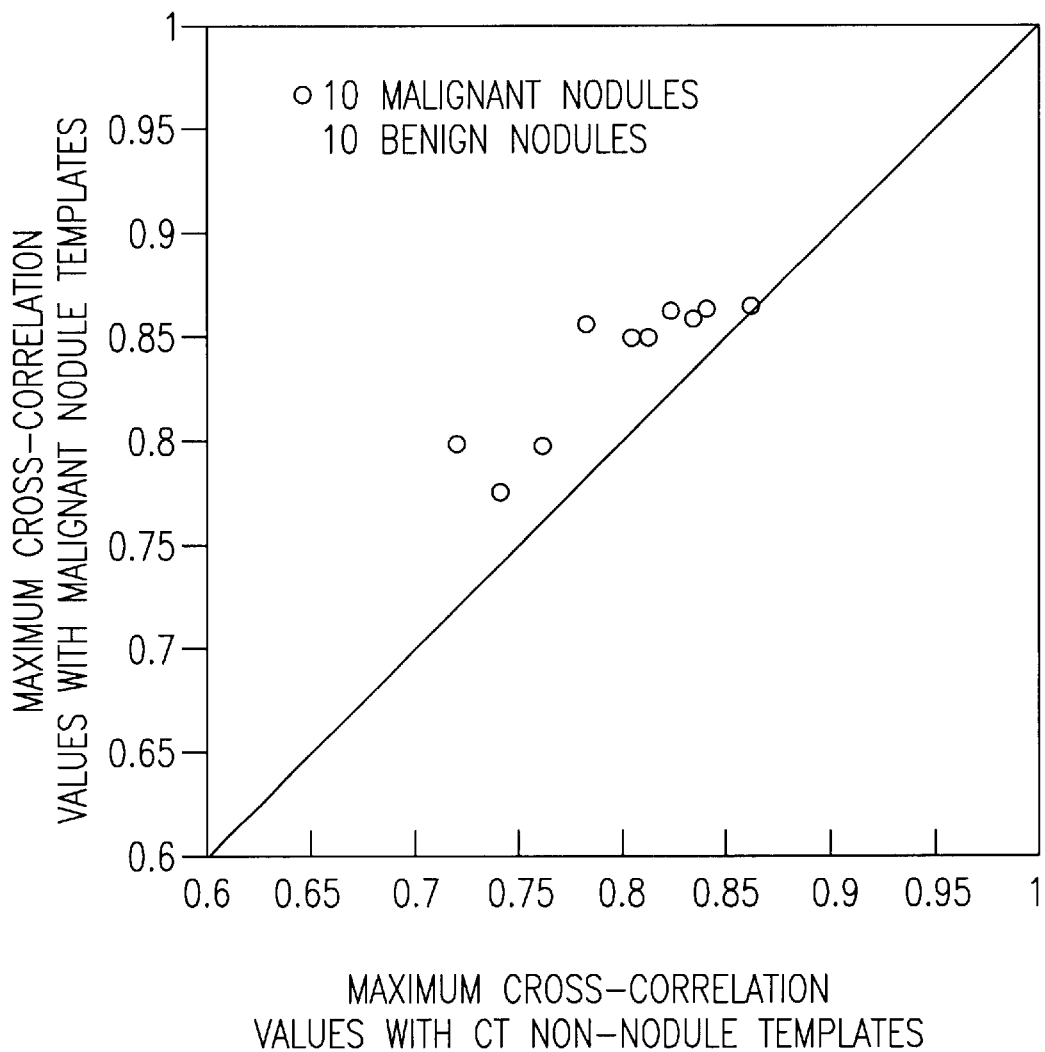
FIG. 18 is a graph illustrating a relationship between the maximum cross-correlation values with 180 malignant nodule templates and 180 benign nodule templates, for 10 malignant nodules (circles) and 10 benign nodules (dots), wherein the 180 malignant nodule templates and 180 benign nodule templates were obtained, respectively, from the 10 typical malignant nodules and 10 typical benign nodules by use of mirror templates, scaled templates, and rotated templates and the dashed line was used as a threshold for distinction between malignant nodules and benign nodules.

FIG. 18 shows the maximum cross-correlation values for 10 malignant nodules (circles) and 10 benign nodules (dots) obtained with the multiple-templates matching technique by use of 180 (18×10) malignant nodule templates and 180 (18×10) benign nodule templates. It is apparent in FIG. 18 that malignant nodules tend to be located above the diagonal line, whereas benign nodules tend to be located below the diagonal line, which indicates that malignant nodules are generally more similar to malignant nodule templates, and benign nodules are generally more similar to benign nodule templates. If the diagonal line is used as a threshold, that is, if those candidates above the diagonal line are accepted as malignant nodules and those candidates below the diagonal line as benign nodules, then it is possible to eliminate 8 (80%) benign nodules while retaining all the malignant nodules. This result indicates that the multiple-templates matching technique has the ability to distinguish benign nodules from malignant nodules, in order to improve the performance of CAD schemes for classification between benign lesions and malignant lesions due to many cancers, such as lung cancer, breast cancer, colon cancer, and stomach cancer.

Computer Program Product

The mechanisms and processes set forth in the present description may be implemented using a conventional general purpose microprocessor or computer programmed according to the teachings in the present specification, as will be appreciated by those skilled in the relevant art(s). Appropriate software coding can readily be prepared by skilled programmers based on the teachings of the present disclosure, as will also be apparent to those skilled in the relevant art(s). However, as will be readily apparent to those skilled in the art, the present invention also may be implemented by the preparation of application-specific integrated circuits or by interconnecting an appropriate network of conventional component circuits.

The present invention thus also includes a computer-based product which may be hosted on a storage medium and include instructions which can be used to program a general purpose microprocessor or computer to perform processes in accordance with the present invention. This storage medium can include, but is not limited to, any type of disk including floppy disks, optical disks, CD-ROMs, magneto-optical disks, ROMs, RAMs, EPROMs, EEPROMs, flash memory, magnetic or optical cards, or any type of media suitable for storing electronic instructions.

The programming of the general purpose microprocessor or computer may include a software module for digitizing and storing images obtained from an image acquisition device (not shown). Alternatively, the present invention can also be implemented to process digital data derived from images obtained by other means, such as a picture archive communication system (PACS) or directly from an imaging device which produces digital image data. In other words, the digital images being processed may already be in existence in digital form and need not be converted to digital form in practicing the invention.

Numerous modifications and variations of the present invention are possible in light of the above teachings. It is therefore to be understood that within the scope of the appended claims, the invention may be practiced otherwise than as specifically described herein.

LIST OF REFERENCES

1. J. V. Forrest and P. J. Friedman, "Radiologic errors in patients with lung cancers," West J. Med. 134, 485–490, (1981).
2. D. P. Naidichi, E. A. Zerhouni, and S. S. Slegelman, Computer tomography of thorax (Raven, N.Y., 1984), pp. 171–199.
3. J. R. Muhm, R. S. Miller, R. S. Fontana, et al, "Lung cancer detected during a screening program using four-month chest radiographs," Radiology 148, 609–615 (1983).
4. M. L. Giger, K. Doi, and H. MacMahon, "Image feature analysis and computer-aided diagnosis in digital radiography. 3. Automated detection of nodules in peripheral lung fields," Med. Phys. 15, 158–166 (1988).
5. M. L. Giger, K. Doi, H. MacMahon, C. E. Metz, and F. F. Yin, "Pulmonary nodules: computer aided detection in digital chest image," RadioGraphics 10, 41–51 (1990).
6. T. Matsumoto, H. Yoshimura, K. Doi, M. L. Giger, A. Kano, H. MacMahon, K. Abe, and S. M. Montner, "Image feature analysis of false-positive diagnoses produced by automated detection of lung nodules," Invest. Radiol. 27, 587–597 (1992).
7. Y. C. Wu, K. Doi, M. L. Giger, C. E. Metz, and W. Zhang, "Reduction of false positives in computerized detection of lung nodules in chest radiographs using artificial neural networks, discriminant analysis and a rule-based scheme," J. Digital Imag. 7, 196–207 (1994).
8. T. Kobayashi, X. W. Xu, H. MacMahon, C. E. Metz, and K. Doi, "Effect of a computer-aided diagnosis scheme on radiologists' performance in detection of lung nodules on radiographs." Radiology 199, 843–848 (1996).
9. X. W. Xu, K. Doi, T. Kobayashi, H. MacMahon, and M. L. Giger, "Development of an improved CAD scheme for automated detection of lung nodules in digital chest images," Med. Phys. 24, 1395–1403(1997).
10. J. Shiraishi, S. Katsuragawa, J. Ikezoe, T. Kobayashi, K. Komatsu, M. Matsui, H. Fujita, Y. Kodera, and K. Doi, "Development of a digital image database for chest radiographs with and without a lung nodule: Receiver operating characteristic analysis of radiologists' detection of pulmonary nodules," AJR 147, 71–74 (2000).
11. X. W. Xu, K. Doi, "Image feature analysis for computer-aided diagnosis: Accurate determination of ribcage boundary in chest radiographs," Med. Phys. 22, 617–626 (1995).
12. X. W. Xu, K. Doi, "Image feature analysis for computer-aided diagnosis: Detection of right and left hemidiaphragm edges and delineation of lung field in chest radiographs," Med. Phys. 23, 1613–1624(1996).
13. S. G. Armato 111, M. L. Giger, C. J. Moran, J. T. Blackburn, K. Doi, and H. MacMahon, "Computerized detection of pulmonary nodules on CT scans," Radiographics 19, 1303–1311, (1999).

What is new and useful and desired to be secured by Letters Patent of the United States:

1. In a method to determine whether a candidate abnormality in a medical digital image is an actual abnormality, the improvement comprising:

obtaining plural first templates and plural second templates respectively corresponding to predetermined abnormalities and predetermined non-abnormalities;

comparing the candidate abnormality in the medical digital image with the obtained first and second templates to derive cross-correlation values between the candidate abnormality and each of the obtained first and second templates;

determining the largest cross-correlation value derived in the comparing step and whether the largest cross-correlation value is produced by comparing the candidate abnormality with the first templates or with the second templates; and determining the candidate abnormality to be an actual abnormality when the largest cross-correlation value is produced by comparing the candidate abnormality with the first templates and determining the candidate abnormality to be a non-abnormality when the largest cross-correlation value is produced by comparing the candidate abnormality with the second templates.

2. The method of claim 1, wherein said step of obtaining plural first templates and plural second templates comprises:

obtaining plural first templates and plural second templates which are smaller in size than the candidate abnormality.

3. The method of claim 2, wherein said comparing step comprises:

comparing the candidate abnormality with the obtained first and second templates to derive cross-correlation values between the candidate abnormality and each of the obtained first and second templates; and shifting the first and second templates in relation to said candidate abnormality to derive cross-correlation values between the candidate abnormality and each of the shifted first and second templates.

4. The method of claim 3, wherein said step of obtaining plural first templates and plural second templates comprises:

producing additional first and second templates which are mirror images of the obtained plural first templates and plural second templates.

5. The method of claim 4, wherein said step of obtaining plural first templates and plural second templates comprises:

producing additional first templates which are scaled versions of the obtained plural first templates.

6. The method of claim 4, wherein said step of obtaining plural first templates and plural second templates comprises:

producing additional first and second templates which are rotated versions of the obtained plural first templates and plural second templates.

7. The method of claim 6, wherein said step of obtaining plural first templates and plural second templates comprises:

obtaining candidate first templates and candidate second templates;

comparing the candidate first templates to at least one known non-abnormality structure and retaining as first templates only those candidate first templates which exhibit a predetermined degree of non-similarity to the at least one known non-abnormality structure; and comparing the candidate second templates to at least one known abnormality structure and retaining as second templates only those candidate second templates which exhibit a predetermined degree of non-similarity to the at least one known abnormality structure.

8. The method of claim 3, wherein said step of obtaining plural first templates and plural second templates comprises:
producing additional first templates which are scaled versions of the obtained plural first templates.

9. The method of claim 3, wherein said step of obtaining plural first templates and plural second templates comprises:
producing additional first and second templates which are rotated versions of the obtained plural first templates and plural second templates.

10. The method of claim 3, wherein said step of obtaining plural first templates and plural second templates comprises:
obtaining candidate first templates and candidate second templates;
comparing the candidate first templates to at least one known non-abnormality structure and retaining as first templates only those candidate first templates which exhibit a predetermined degree of non-similarity to the at least one known non-abnormality structure; and
comparing the candidate second templates to at least one known abnormality structure and retaining as second templates only those candidate second templates which exhibit a predetermined degree of non-similarity to the at least one known abnormality structure.

11. The method of claim 3, further comprising:
obtaining plural third templates and plural fourth templates respectively corresponding to predetermined malignant abnormalities and predetermined benign abnormalities;
comparing the actual abnormality with the obtained third and fourth templates to derive cross-correlation values between the actual abnormality and each of the obtained third and fourth templates;
determining the largest cross-correlation value derived in the preceding comparing step and whether the largest cross-correlation value is produced by comparing the actual abnormality with the third templates or with the fourth templates; and
classifying the actual abnormality as a malignant abnormality when the largest cross-correlation value is produced by comparing the actual abnormality with the third templates and classifying the actual abnormality as a benign abnormality when the largest cross-correlation value is produced by comparing the actual abnormality with the fourth templates.

12. The method of claim 2, wherein said step of obtaining plural first templates and plural second templates comprises:
producing additional first and second templates which are mirror images of the obtained plural first templates and plural second templates.

13. The method of claim 7, wherein said step of obtaining plural first templates and plural second templates comprises:
producing additional first templates which are scaled versions of the obtained plural first templates.

14. The method of claim 7, wherein said step of obtaining plural first templates and plural second templates comprises:
producing additional first and second templates which are rotated versions of the obtained plural first templates and plural second templates.

15. The method of claim 2, wherein said step of obtaining plural first templates and plural second templates comprises:
producing additional first templates which are scaled versions of the obtained plural first templates.

16. The method of claim 2, wherein said step of obtaining plural first templates and plural second templates comprises:
producing additional first and second templates which are rotated versions of the obtained plural first templates and plural second templates.

17. The method of claim 2, wherein said step of obtaining plural first templates and plural second templates comprises:
obtaining candidate first templates and candidate second templates;
comparing the candidate first templates to at least one known non-abnormality structure and retaining as first templates only those candidate first templates which exhibit a predetermined degree of non-similarity to the at least one known non-abnormality structure; and
comparing the candidate second templates to at least one known abnormality structure and retaining as second templates only those candidate second templates which exhibit a predetermined degree of non-similarity to the at least one known abnormality structure.

18. The method of claim 2, further comprising:
obtaining plural third templates and plural fourth templates respectively corresponding to predetermined malignant abnormalities and predetermined benign abnormalities;
comparing the actual abnormality with the obtained third and fourth templates to derive cross-correlation values between the actual abnormality and each of the obtained third and fourth templates;
determining the largest cross-correlation value derived in the preceding comparing step and whether the largest cross-correlation value is produced by comparing the actual abnormality with the third templates or with the fourth templates; and
classifying the actual abnormality as a malignant abnormality when the largest cross-correlation value is produced by comparing the actual abnormality with the third templates and classifying the actual abnormality as a benign abnormality when the largest cross-correlation value is produced by comparing the actual abnormality with the fourth templates.

19. The method of claim 1, wherein said step of obtaining plural first templates and plural second templates comprises:
producing additional first and second templates which are mirror images of the obtained plural first templates and plural second templates.

20. The method of claim 1, wherein said step of obtaining plural first templates and plural second templates comprises:
producing additional first templates which are scaled versions of the obtained plural first templates.

21. The method of claim 1, wherein said step of obtaining plural first templates and plural second templates comprises:
producing additional first and second templates which are rotated versions of the obtained plural first templates and plural second templates.

22. The method of claim 1, wherein said step of obtaining plural first templates and plural second templates comprises:
obtaining candidate first templates and candidate second templates;
comparing the candidate first templates to at least one known non-abnormality structure and retaining as first templates only those candidate first templates which exhibit a predetermined degree of non-similarity to the at least one known non-abnormality structure; and
comparing the candidate second templates to at least one known abnormality structure and retaining as second templates only those candidate second templates which exhibit a predetermined degree of non-similarity to the at least one known abnormality structure.

23. The method of claim 22, further comprising:

obtaining plural third templates and plural fourth templates respectively corresponding to predetermined malignant abnormalities and predetermined benign abnormalities;

comparing the actual abnormality with the obtained third and fourth templates to derive cross-correlation values between the actual abnormality and each of the obtained third and fourth templates;

determining the largest cross-correlation value derived in the preceding comparing step and whether the largest cross-correlation value is produced by comparing the actual abnormality with the third templates or with the fourth templates; and classifying the actual abnormality as a malignant abnormality when the largest cross-correlation value is produced by comparing the actual abnormality with the third templates and classifying the actual abnormality as a benign abnormality when the largest cross-correlation value is produced by comparing the actual abnormality with the fourth templates.

24. The method of claim 1, further comprising:

obtaining plural third templates and plural fourth templates respectively corresponding to predetermined malignant abnormalities and predetermined benign abnormalities;

comparing the actual abnormality with the obtained third and fourth templates to derive cross-correlation values between the actual abnormality and each of the obtained third and fourth templates;

determining the largest cross-correlation value derived in the preceding comparing step and whether the largest cross-correlation value is produced by comparing the actual abnormality with the third templates or with the fourth templates; and classifying the actual abnormality as a malignant abnormality when the largest cross-correlation value is produced by comparing the actual abnormality with the third templates and classifying the actual abnormality as a benign abnormality when the largest cross-correlation value is produced by comparing the actual abnormality with the fourth templates.

25. In a method of classifying an abnormality in a medical digital image, the improvement comprising:

obtaining plural first templates and plural second templates respectively corresponding to predetermined malignant abnormalities and predetermined benign abnormalities;

comparing the abnormality in the medical digital image with the obtained first and second templates to derive cross-correlation values between the abnormality and each of the obtained first and second templates;

determining the largest cross-correlation value derived in the comparing step and whether the largest cross-correlation value is produced by comparing the abnormality with the first templates or with the second templates; and classifying the abnormality as a malignant abnormality when the largest cross-correlation value is produced by comparing the abnormality with the first templates and classifying the abnormality as a benign abnormality when the largest cross-correlation value is produced by comparing the abnormality with the second templates.

26. The method of claim 25, wherein said step of obtaining plural first templates and plural second templates comprises:

obtaining plural first templates and plural second templates which are smaller in size than said abnormality in said medical digital image.

27. The method of claim 26, wherein said comparing step comprises:

comparing the candidate abnormality with the obtained first and second templates to derive cross-correlation values between the candidate abnormality and each of the obtained first and second templates; and shifting the first and second templates in relation to the abnormality to derive cross-correlation values between the abnormality and each of the shifted first and second templates.

28. The method of claim 27, wherein said step of obtaining plural first templates and plural second templates comprises:

producing additional first and second templates which are mirror images of the obtained plural first templates and plural second templates.

29. The method of claim 28, wherein said step of obtaining plural first templates and plural second templates comprises:

producing additional first templates which are scaled versions of the obtained plural first templates.

30. The method of claim 29, wherein said step of obtaining plural first templates and plural second templates comprises:

obtaining candidate first templates and candidate second templates;

comparing the candidate first templates to at least one known non-abnormality structure and retaining as first templates only those candidate first templates which exhibit a predetermined degree of non-similarity to the at least one known non-abnormality structure; and comparing the candidate second templates to at least one known abnormality structure and retaining as second templates only those candidate second templates which exhibit a predetermined degree of non-similarity to the at least one known abnormality structure.

31. The method of claim 28, wherein said step of obtaining plural first templates and plural second templates comprises:

obtaining candidate first templates and candidate second templates;

comparing the candidate first templates to at least one known non-abnormality structure and retaining as first templates only those candidate first templates which exhibit a predetermined degree of non-similarity to the at least one known non-abnormality structure; and comparing the candidate second templates to at least one known abnormality structure and retaining as second templates only those candidate second templates which exhibit a predetermined degree of non-similarity to the at least one known abnormality structure.

32. The method of claim 27, wherein said step of obtaining plural first templates and plural second templates comprises:

producing additional first templates which are scaled versions of the obtained plural first templates.

33. The method of claim 32, wherein said step of obtaining plural first templates and plural second templates comprises:

producing additional first and second templates which are rotated versions of the obtained plural first templates and plural second templates.

34. The method of claim 33, wherein said step of obtaining plural first templates and plural second templates comprises:

obtaining candidate first templates and candidate second templates;

comparing the candidate first templates to at least one known non-abnormality structure and retaining as first templates only those candidate first templates which exhibit a predetermined degree of non-similarity to the at least one known non-abnormality structure; and comparing the candidate second templates to at least one known abnormality structure and retaining as second templates only those candidate second templates which exhibit a predetermined degree of non-similarity to the at least one known abnormality structure.

35. The method of claim 27, wherein said step of obtaining plural first templates and plural second templates comprises:

producing additional first and second templates which are rotated versions of the obtained plural first templates and plural second templates.

36. The method of claim 27, wherein said step of obtaining plural first templates and plural second templates comprises:

obtaining candidate first templates and candidate second templates;

comparing the candidate first templates to at least one known non-abnormality structure and retaining as first templates only those candidate first templates which exhibit a predetermined degree of non-similarity to the at least one known non-abnormality structure; and comparing the candidate second templates to at least one known abnormality structure and retaining as second templates only those candidate second templates which exhibit a predetermined degree of non-similarity to the at least one known abnormality structure.

37. The method of claim 26, wherein said step of obtaining plural first templates and plural second templates comprises:

producing additional first and second templates which are mirror images of the obtained plural first templates and plural second templates.

38. The method of claim 26, wherein said step of obtaining plural first templates and plural second templates comprises:

producing additional first templates which are scaled versions of the obtained plural first templates.

39. The method of claim 26, wherein said step of obtaining plural first templates and plural second templates comprises:

producing additional first and second templates which are rotated versions of the obtained plural first templates and plural second templates.

40. The method of claim 26, wherein said step of obtaining plural first templates and plural second templates comprises:

obtaining candidate first templates and candidate second templates;

comparing the candidate first templates to at least one known non-abnormality structure and retaining as first templates only those candidate first templates which exhibit a predetermined degree of non-similarity to the at least one known non-abnormality structure; and comparing the candidate second templates to at least one known abnormality structure and retaining as second templates only those candidate second templates which exhibit a predetermined degree of non-similarity to the at least one known abnormality structure.

41. The method of claim 25, wherein said step of obtaining plural first templates and plural second templates comprises:

producing additional first and second templates which are mirror images of the obtained plural first templates and plural second templates.

42. The method of claim 25, wherein said step of obtaining plural first templates and plural second templates comprises:

producing additional first templates which are scaled versions of the obtained plural first templates.

43. The method of claim 25, wherein said step of obtaining plural first templates and plural second templates comprises:

producing additional first and second templates which are rotated versions of the obtained plural first templates and plural second templates.

44. The method of claim 25, wherein said step of obtaining plural first templates and plural second templates comprises:

obtaining candidate first templates and candidate second templates;

comparing the candidate first templates to at least one known non-abnormality structure and retaining as first templates only those candidate first templates which exhibit a predetermined degree of non-similarity to the at least one known non-abnormality structure; and comparing the candidate second templates to at least one known abnormality structure and retaining as second templates only those candidate second templates which exhibit a predetermined degree of non-similarity to the at least one known abnormality structure.

45. A system for implementing the method of any one of claims 1–44.

46. A computer readable medium storing a program for performing the steps recited in any one of claims 1–44.

* * * * *